(12) United States Patent
Gilbert

(10) Patent No.: US 10,815,071 B2
(45) Date of Patent: Oct. 27, 2020

(54) CONVEYOR BELT SCRAPER

(71) Applicant: Mark Gilbert, Picton (AU)

(72) Inventor: Mark Gilbert, Picton (AU)

(73) Assignee: Mark Gilbert, Picton (AU)

( * ) Notice: Subject to any disclaimer, the term of this patent is extended or adjusted under 35 U.S.C. 154(b) by 0 days.

(21) Appl. No.: 16/396,174

(22) Filed: Apr. 26, 2019

(65) Prior Publication Data

US 2019/0248599 A1    Aug. 15, 2019

Related U.S. Application Data

(63) Continuation-in-part of application No. PCT/AU2017/051176, filed on Oct. 26, 2017.

(30) Foreign Application Priority Data

Oct. 26, 2016    (AU) .................................. 2016904363

(51) Int. Cl.
*B65G 45/14* (2006.01)
*B65G 45/12* (2006.01)

(52) U.S. Cl.
CPC ............. *B65G 45/14* (2013.01); *B65G 45/12* (2013.01)

(58) Field of Classification Search
CPC ......... B65G 45/12; B65G 45/14; B65G 45/16
See application file for complete search history.

(56) References Cited

U.S. PATENT DOCUMENTS

| 3,782,534 A * | 1/1974 | Holleman | B65G 45/12 |
| | | | 198/499 |
| 4,787,500 A | 11/1988 | Holz | |
| 4,969,553 A * | 11/1990 | Stoll | B65G 45/16 |
| | | | 198/499 |
| 2015/0059117 A1 | 3/2015 | Kovacs et al. | |
| 2016/0009501 A1 * | 1/2016 | Aikawa | B65G 45/14 |
| | | | 198/497 |

FOREIGN PATENT DOCUMENTS

GB          509311 A      7/1939

OTHER PUBLICATIONS

PCT International Search Report and the Written Opinion dated Nov. 22, 2017, issued in related International Application No. PCT/AU2017/051176 (8 pages).

\* cited by examiner

*Primary Examiner* — William R Harp
(74) *Attorney, Agent, or Firm* — Sheppard Mullin Richter & Hampton LLP

(57) ABSTRACT

A conveyor belt scraper (100) comprising a mounting base (110) adapted to be mounted on a support structure. A pivot body 300 is pivotally connected to the mounting base (110). First and second scraper blades (500), are secured to the pivot body (300), wherein a scraping tip (520) of the first scraper blade (500) and a scraping tip (530) of the second scraper blade (500) are separated by a space and the scraping tips (520, 530) each extend generally parallel to a pivot axis of the pivot body (300). The pivot assembly (300) is pivotal about the pivot axis so that a position of each scraper tip (520, 530) is variable.

20 Claims, 18 Drawing Sheets

CONVEYOR BELT SCRAPER

CROSS REFERENCE TO RELATED APPLICATIONS

The present application is a continuation-in-part application of International Application No. PCT/AU2017/051176, filed on Oct. 26, 2017, which claims priority of benefit to Australian Patent Application No. 2016904363, filed on Oct. 26, 2016. The contents of the above-referenced applications are hereby incorporated by reference in their entirety.

TECHNICAL FIELD

The present disclosure relates to a conveyor belt scraper. In particular, the present invention relates to a conveyor belt scraper for use with coal or various ores or minerals. However, it will be appreciated by those skilled in the art that the conveyor belt scraper can be applied to other applications and industries.

BACKGROUND OF THE INVENTION

Coal is generally extracted by either underground mining operations, or open-cut mining operations. After extraction of the raw coal, it is necessary to process the raw coal into final products depending on the intended market, and the quality and composition of the raw coal. Typical processing includes crushing to a uniform size and beneficiation. Beneficiation may include washing and other processes to remove ash, sulphur and rock particles. Coal has properties which dictate that coal particles and/or coal slurry are particularly susceptible to sticking to conveyor belts, especially at certain moisture levels.

During processing, and/or transportation, it is common for the coal to be transported on conveyor belts between locations, and between process stages. It is typical for some coal to become stuck to the belt. This is especially common when the coal is wet or has been wet during beneficiation. It is important to remove any coal from the conveyor belt which has become adhered to the belt. This is important to prevent the coal from damaging any drive machinery located on the underside of the belt. This is also important in order to improve conveyor belt efficiency to ensure the majority of material is unloaded. Furthermore, any coal or sludge which proceeds to the underside of the conveyor belt can be difficult to access and hence remove at a later time.

In order to remove excess coal which has not fallen off the conveyor due to gravity as the conveyor belt changes directions, conveyor scrapers are often installed on the underside of the conveyor belt, adjacent to a roller which normally directs the belt around 180 degrees. The conveyor scraper is generally in the form of a metal blade which scrapes across the surface of the conveyor belt, physically scraping any coal from the surface. The scraped coal is caught and returned to the processing line.

Whilst the process has been described with application in coal processing, it will be appreciated that it is applicable to processing other minerals, and use in other industries such as food processing and agriculture etc.

There are several drawbacks associated with existing scraper blades. One issue concerns the scraper blades being destroyed or at least damaged by the coal, and/or causing damage to the conveyor belt or mechanical clip. In order to extend the life of the scraper blades, some scraper blades are manufactured with resilient zones intended to elastically deform when the metal scraper tip encounters an obstruction.

Such resilient blades are known to still suffer from damage during use on account of the large loads that may be applied, and owing to the limited amount of elastic deformability or spring.

The process of replacing damaged scraper blades generally requires the conveyor belt to be stopped, which accordingly requires the coal processing or transportation to be temporarily halted. This can be costly due to replacement scraper blade costs, labour and undesirable process downtime.

A further disadvantage with existing scraper blades concerns the pressure applied to the conveyor belt by the scraper tip. In practice, due to factor such as belt speed and weight there is a tendency for the tip of the scraper to flex and roll backward, which may result in inconsistent, and unintended scraping angles. In practice, this can result in the scrapers not operating at their intended, optimum levels. Conventional scrapers are not particularly adaptable to changing conditions during operation.

Another disadvantage of existing scraper blades is that they are directional, meaning they must be installed facing a certain direction, and they cannot be used with reversible conveyor belts.

Accordingly, existing scraper blades suffer from undesired damage and hence reduced longevity during use.

OBJECT OF THE INVENTION

It is an object of the present invention to substantially overcome or at least ameliorate one or more of the above disadvantages, or to provide a useful alternative.

SUMMARY

In a first aspect, the present invention provides a conveyor belt scraper comprising:

a mounting base adapted to be mounted on a support structure;

a pivot assembly pivotally connected to the mounting base;

first and second scraper blades secured to the pivot assembly, wherein a scraping tip of the first scraper blade and a scraping tip of the second scraper blade are separated by a space and the scraping tips each extend generally parallel to a pivot axis of the pivot body, wherein the pivot assembly is pivotal between:
  a neutral position in which each scraper tip is located on a common plane;
  a first position in which the first scraper tip is located above the common plane and the second scraper tip is located below the common plane; and
  a second position in which the first scraper tip is located below the common plane and the second scraper tip is located above the common plane.

The mounting base preferably includes a first female engagement formation in the form of an arcuate recess, and a first male engagement formation in the form of an arcuate projection;

further wherein the pivot assembly includes a corresponding second female engagement formation in the form of arcuate channel and a corresponding second male engagement formation in the form of an arcuate flange.

Preferably a surface of the pivot assembly closest to the mounting base is arcuate, and adapted to be received by a corresponding arcuate surface of the mounting base.

The second female engagement formation and the second male engagement formation of the pivot assembly preferably define a protrusion having an inverted T-shaped profile in cross-section, located generally equidistant between the first and second scraper blades.

The mounting base preferably includes first and second stopper formations configured to abut against opposing ends of the protrusion having an inverted T-shaped profile to define the first and second scraper blade positions.

The stopper formations preferably terminate in abutment with or adjacent to an arcuate underside surface of the pivot assembly.

The mounting base is preferably defined by a first mounting base member and a second like mounting base member which are secured to each other with one or more fasteners.

A proximal portion of the pivot assembly is preferably seated between distal portions of the first mounting base member and the second mounting base member.

A pivot axis of the pivot assembly is preferably located on a plane which passes through an axis of symmetry of the mounting base when viewed in end view.

The first and second scraper tips are preferably adapted to extend longitudinally in a direction which is generally perpendicular to a drive direction of an adjacent conveyor belt.

Preferably each of the first and second scraper blades is generally planar and is partially embedded within the pivot assembly, such that the scraping tip protrudes from the pivot assembly.

A portion of the pivot assembly located between the first and second scraper blades preferably has a central ridge defined by two inclined surfaces, in the form of a generally inverted "V" shaped portion.

The conveyor belt scraper further preferably comprises at least one material removal cut-out located in a lateral portion of the pivot assembly.

The mounting base preferably includes a curved surface located beneath the material removal cut-out to direct material away from the mounting base.

The material removal cut-out is preferably positioned on each of two opposing lateral sides of the conveyor belt scraper, such that when a first conveyor belt scraper is positioned adjacent to a second, like conveyor belt scraper, a cut-out of the first conveyor belt scraper and a cut-out of the second conveyor belts scraper combine to define a material removal passage.

The mounting base preferably includes a fluid flow passage extending generally parallel with the first and second scraper blades, the fluid flow passage being couplable with an adjacent like conveyor belt scraper.

The fluid flow passage is preferably in fluid communication with a spray nozzle.

The spray nozzle preferably directs liquid toward the first and second scraper blades through a clearance defined between the pivot assemblies of two adjacent like conveyor belt scrapers.

The mounting base preferably includes an arm having a proximal end mounted to a support rod and a distal end pivotally mounted to the pivot assembly.

The distal end of the arm is preferably secured to the pivot assembly with a pin connection.

The pivot assembly is preferably configured to pivot up to about 180 degrees relative to the distal end of the arm.

A channel preferably extends through a portion of the pivot assembly, the channel extending in a direction generally perpendicular to an axis of rotation of the pin connection, and the distal end of the arm is located within the channel.

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENTS

Figure 1:
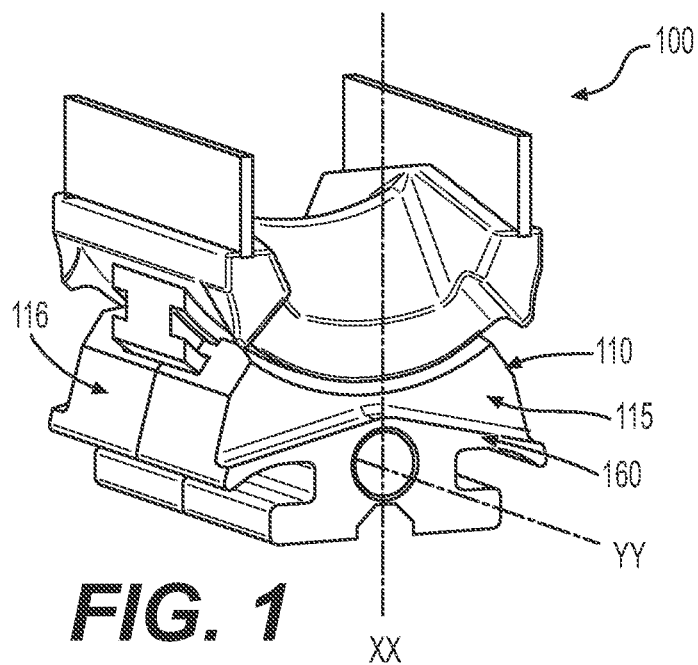
FIG. 1 is a perspective view showing a first embodiment of a conveyor belt scraper according to the present invention.
Figure 2:
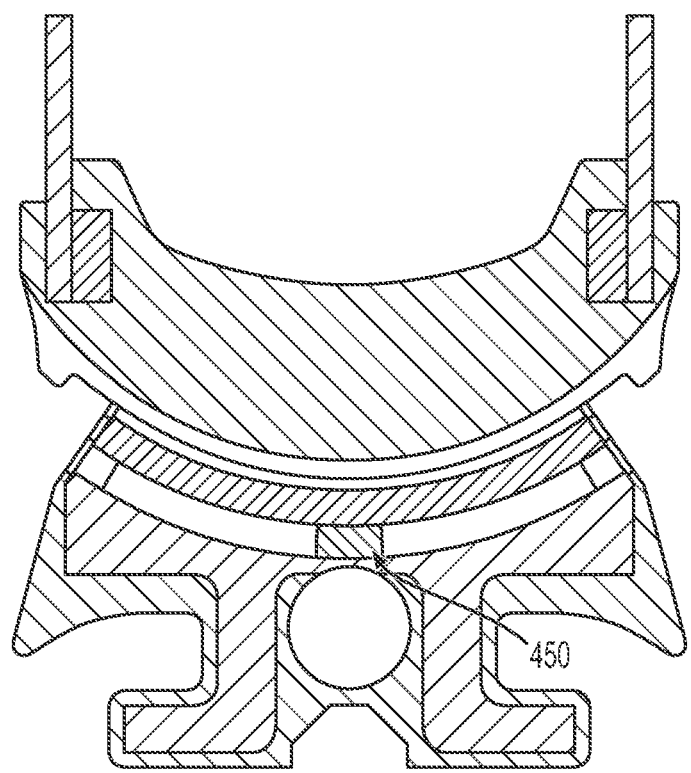
FIG. 2 is a cross-sectional perspective view of the conveyor belt scraper of FIG. 1.

A conveyor belt scraper 100 is disclosed herein. The conveyor belt scraper 100 includes a mounting base 110 which is defined by a first mounting base member 115 and a second, like mounting base member 116. Referring to FIG. 1, both mounting base members 115, 116 are depicted in abutment. Alternatively, referring to FIG. 4, one of the mounting base members 115, 116 is depicted in isolation.

Figure 4:
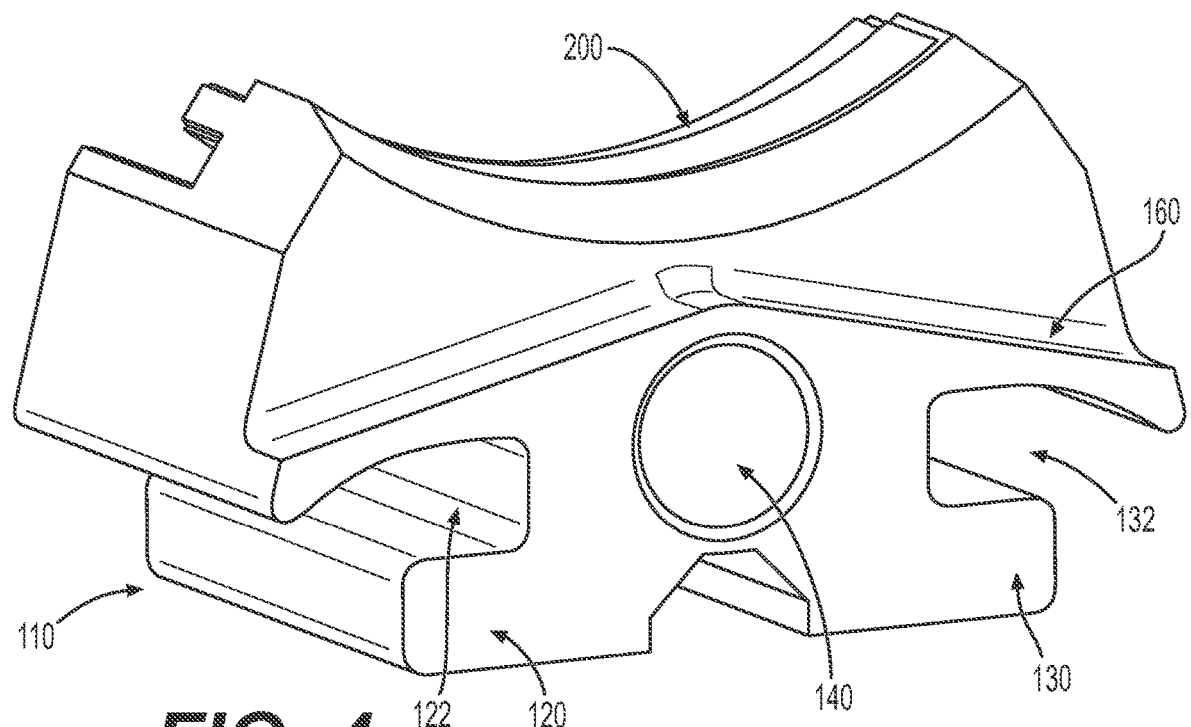
FIG. 4 is a perspective view of a first mounting base member of the conveyor belt scraper of FIG. 1.

The mounting base members 115, 116 are positioned adjacent to each other, as shown in FIG. 1. Referring to FIG. 4, the assembled mounting base 110 has two projections in the form of feet or tabs 120, 130. Each of the tabs 120, 130 is located an equal distance from an axis of symmetry XX of the mounting base member 110 when viewed from the end view. The tabs 120, 130 define recesses 122, 132 which enable the conveyor belt scraper 100 to be mounted to a mounting bar (not shown) which extends in a direction which is generally perpendicular to the direction of movement of a conveyor belt (not shown). The mounting bar is typically positioned on the underside of the conveyor belt, near where the conveyor belt changes direction at a roller, normally by an angle of approximately 180°.

Figure 3:
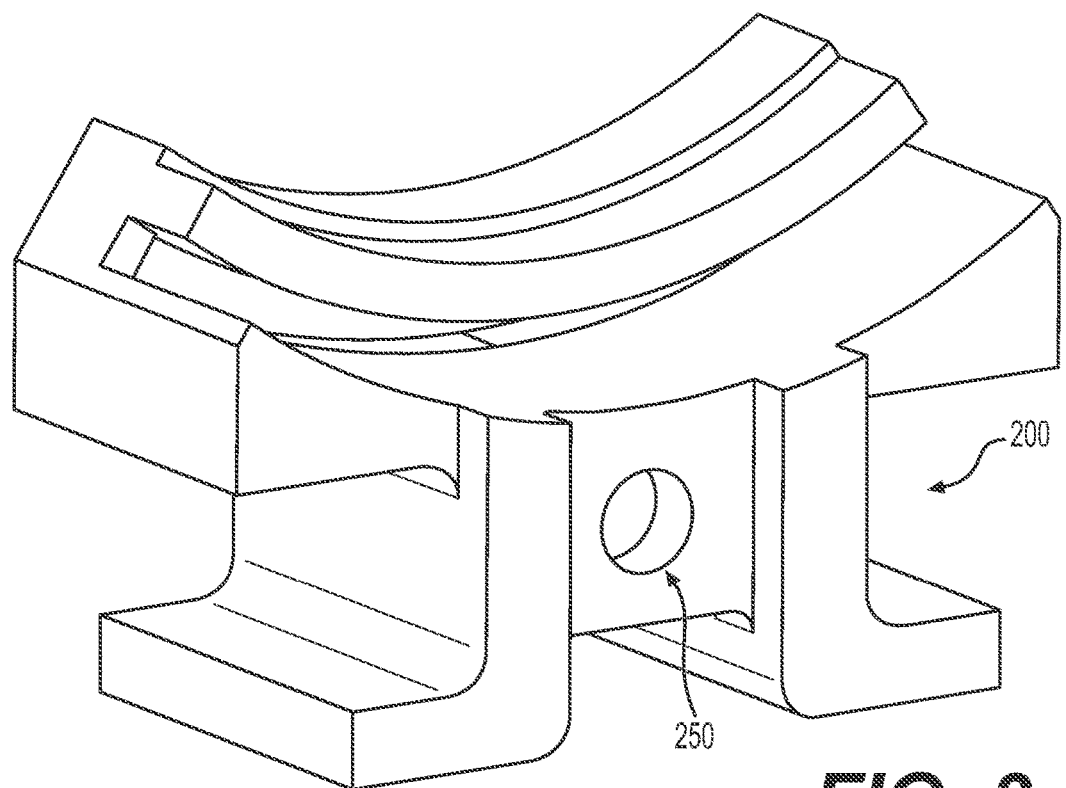
FIG. 3 is a perspective view of a first guide member of the conveyor belt scraper of FIG. 1.

As shown in FIG. 4, a hole 140 extends through the mounting base 110. The hole 140 extends parallel to the longitudinal axis YY. As shown in FIG. 3, the hole 140 is circular, and when a plurality of the mounting bases 110 are arranged longitudinally in abutment, the holes 140 are coaxial.

In the first embodiment, a guide member 200 is depicted in FIG. 3. The guide member 200 is fabricated from steel or another durable engineering material. During manufacture the guide member 200 is cast within each of the first mounting base member 115 and second mounting base member 116. However, it will be appreciated that in an alternative embodiment, not shown, the guide member 200 and the mounting base members 115, 116 may be integrally formed.

Figure 7:
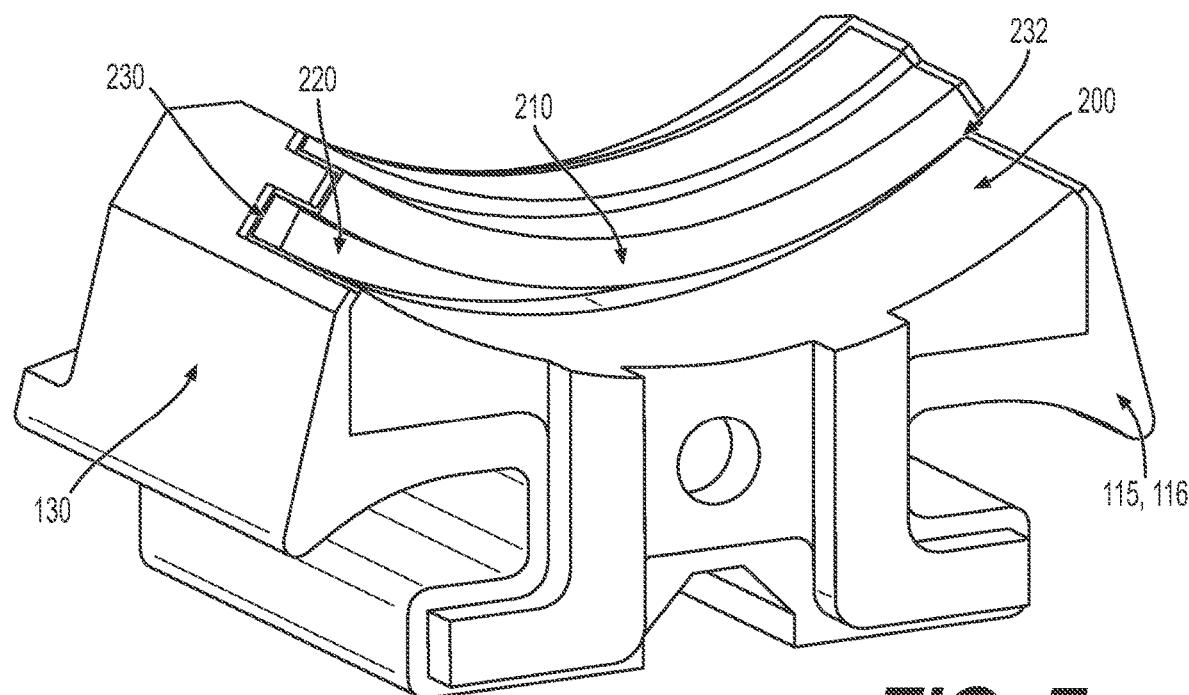
FIG. 7 is a perspective view of a second base member of the conveyor belt scraper of FIG. 1.

The relationship between the guide member 200 and each of the first and second mounting base members 115, 116 is depicted in FIG. 7. The first and second mounting base members 115, 116 are fabricated from a polymer and define laterally inclined surfaces 130.

Referring to FIG. 7, the guide member 200 includes a first male engagement formation in the form of arcuate projection 210. The arcuate projection 210 extends in a direction which is parallel with the axis YY. The arcuate projection 210 is located above a first female engagement formation in the form of an arcuate recess 220. The arcuate projection 210 and the arcuate recess 220 are each defined by a partially annular formation, having a centre point located above the guide member 200 on the axis XX.

As shown in FIG. 7, a projection or stepped surface 230, 232 is located at each extremity of the arcuate recess 220.

Figure 8:
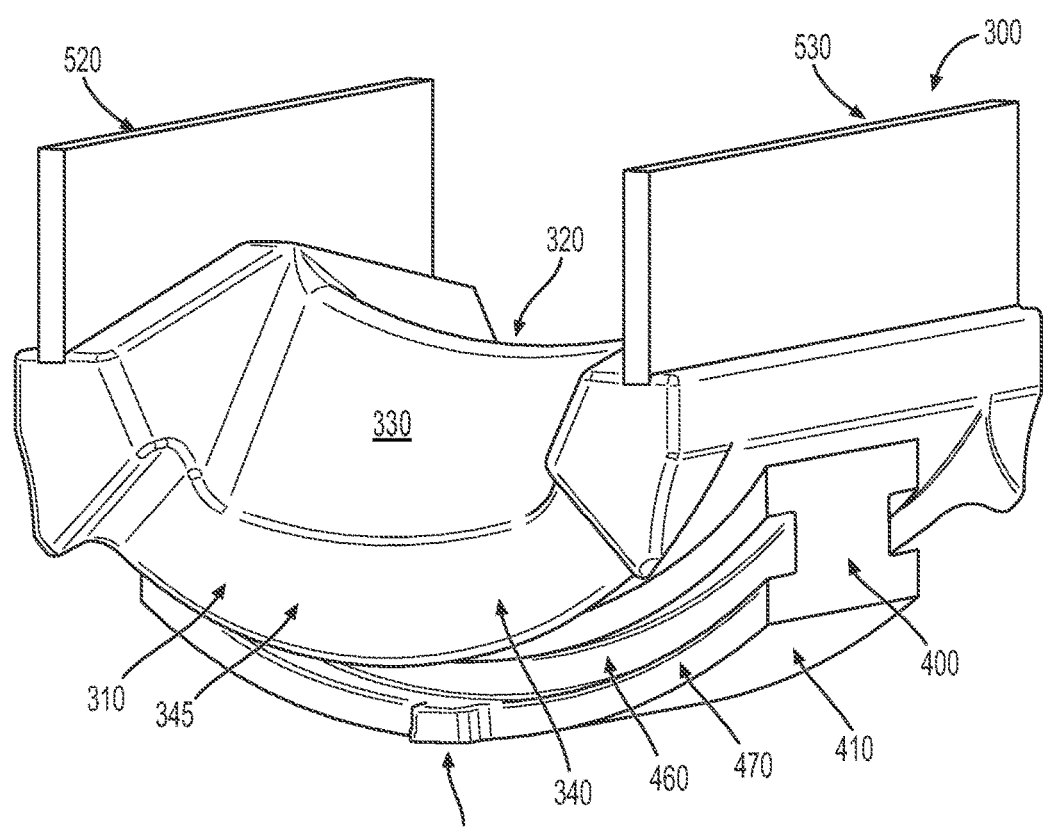
FIG. 8 is a perspective view of a pivot assembly of the conveyor belt scraper of FIG. 1.

A pivot assembly 300 is shown in FIG. 8. The pivot assembly 300 is defined by a pivot body 310, a blade casket 400 and a pair of blades 520, 530. The blade casket 400 is shown in isolation in FIG. 5. The blade casket 400 is typically fabricated from a metal and is cast during manufacture within the pivot body 310. The pivot body 310 is fabricated from a suitable polymer. As shown in FIG. 8, a portion of the blade casket 400 projects from the underside of the pivot body 310, in the form of an arcuate I-shaped protrusion which has an outermost radius corresponding generally with a radius of a portion of the guide member 200 defining the arcuate recess 220.

Figure 5:
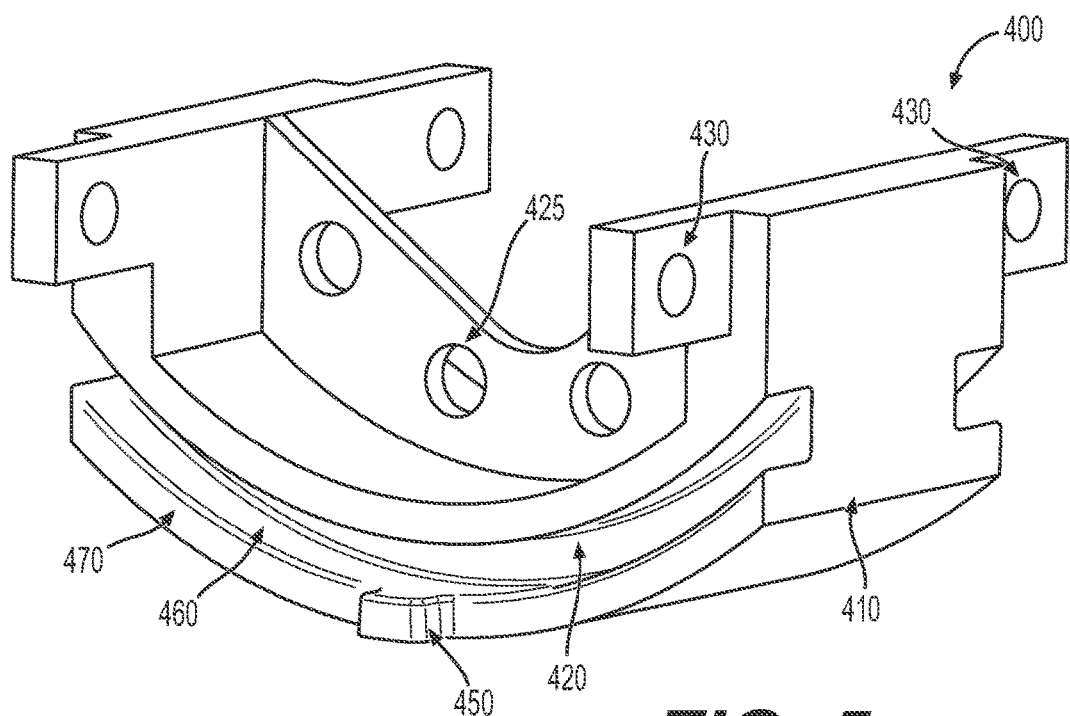
FIG. 5 is a perspective view of a blade casket of the conveyor belt scraper of FIG. 1.

Referring to FIG. 5, the blade casket 400 of the pivot assembly 300 is shown in isolation. A lower portion of the blade casket 400 defines the I-shaped protrusion mentioned above, and has a generally arcuate profile defining an arcuate surface 410.

The blade casket 400 includes a second female engagement formation in the form of an arcuate channel or cut-out 420 which is located above the arcuate surface 410. The arcuate channel 420 corresponds in radius and is adapted to receive the arcuate projection 210 of the guide member 200. The pivot assembly 300 also includes a corresponding second male engagement formation in the form of an arcuate flange 470.

As shown in FIG. 5, the base of the blade casket 400 includes a finger or projection 450. The projection 450 is formed on the outer edge of the arcuate surface 410 on the arcuate flange 470. The projection 450 is located at a median portion of the arcuate surface 410, relative to the length of the arc, such that the projection 450 is positioned evenly between the two scraper blades 500.

Referring to FIG. 8, the pivot body 310 has a central ridge 320 defined by two inclined surfaces 330, such that the pivot body 310 has a generally inverted "V" shape.

Figure 15:
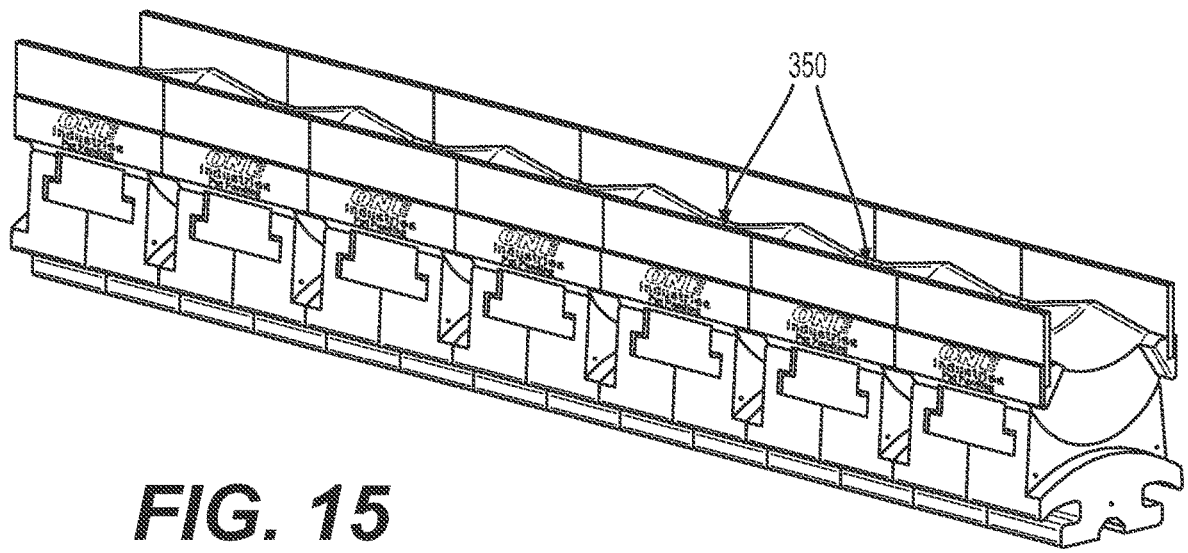
FIG. 15 is a perspective view showing a plurality of the scraper blades of the second embodiment arranged linearly.
Figure 16:
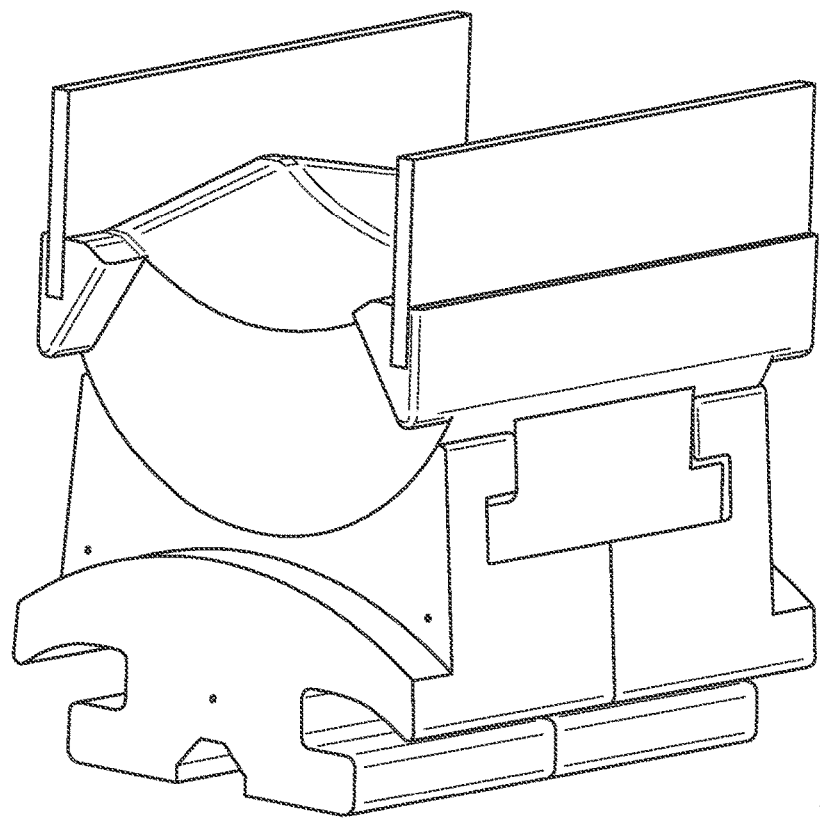
FIG. 16 is a perspective view of the scraper blade of the second embodiment.

Each inclined surface 330 slopes downwardly and outwardly and terminates at a cut-out 340. As such, a cut-out 340 is located on each side of the pivot body 310. When a plurality of the pivot bodies 310 are positioned adjacent to each other, side to side along the axis YY, as depicted in FIG. 15, the adjacent cut-outs 340 provide material removal apertures 345.

The material removal apertures 345 enable coal or other scraped material or liquid to be directed away from the conveyor belt scraper 100. The material removal apertures 345 serve the effect of doubling the material removal capacity through the channels 350 when the conveyor belt scraper 100 is assembled in a row of like conveyor belt scrapers 100 along the axis YY.

Furthermore, any waste material directed downwardly through the material removal apertures 345 is directed onto the pair of inverted "V" shaped inclined surfaces 160 of the mounting base 110, as shown in FIGS. 1 and 4, which directs the material away from the conveyor belt scraper 100.

Figure 6:
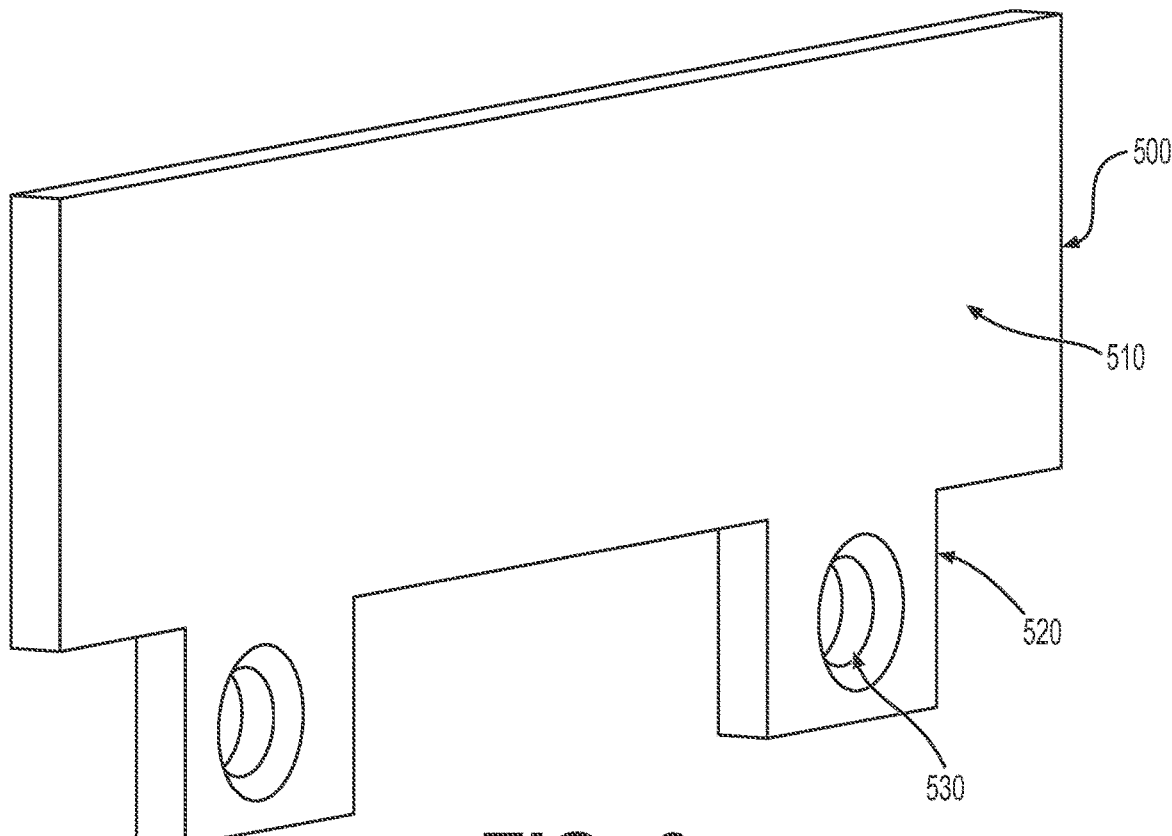
FIG. 6 is perspective view of a blade of the conveyor belt scraper of FIG. 1.

A pair of scraper blades 500 are included in the pivot assembly 300. One of the scraper blades 500 is depicted in isolation in FIG. 6. Each scraper blade 500 is fabricated from a planar piece of steel, such as a hardened steel, tool steel or another suitable material. Each blade 500 has a generally rectangular body 510 and two tabs 520 extend away from the body 510. The tabs 520 each include an aperture 530 for receiving a fastener such as a bolt.

The apertures 530 align with a pair of holes 430 formed on the blade casket 400, as shown in FIG. 5. A pair of fasteners (not shown), such as bolts, secure each blade 500 to one side of the blade casket 400.

Referring to FIG. 8, when each of the blades 500 are mounted to the blade casket 400, each blade 500 extends generally parallel to the adjacent blade 500.

Figure 17:
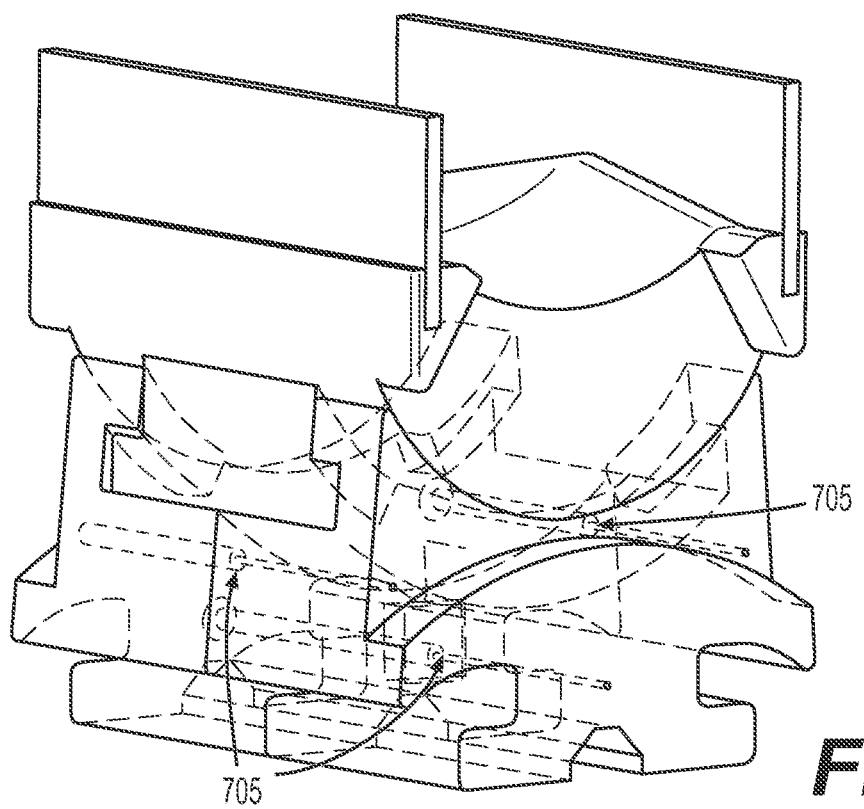
FIG. 17 is a further perspective view of the scraper blade of the second embodiment.

Referring to FIGS. 3 and 4, a central region of each guide member 200 includes a hole 250 which is axially aligned with the hole 140 formed in each of the mounting base members 110, 115. The hole 250 is generally smaller in diameter than the hole 140. This change in diameter provides a fastener securement formation. In particular, when two of the mounting base members 115, 116 are adjacent, they can be secured and clamped to each other with a fastener (not shown) to keep the two mounting base members 115, 116 in abutment along the axis YY. Alternatively, screws 705 may be used. In FIG. 17 an arrangement of three such screws is depicted.

The two mounting base members 115, 116 are clamped together with the pivot assembly 300 partially located therebetween. As such, the first female engagement formation in the form of the arcuate recess 220, and a first male engagement formation in the form of an arcuate projection 210 engage with the corresponding second female engagement formation in the form of arcuate channel 460 and the corresponding second male engagement formation in the form of an arcuate flange 470.

This engagement prevents the pivot assembly 300 from being removed from the mounting base 110. However, the pivot assembly 300 is permitted to pivot relative to the mounting base 110.

Figure 10:
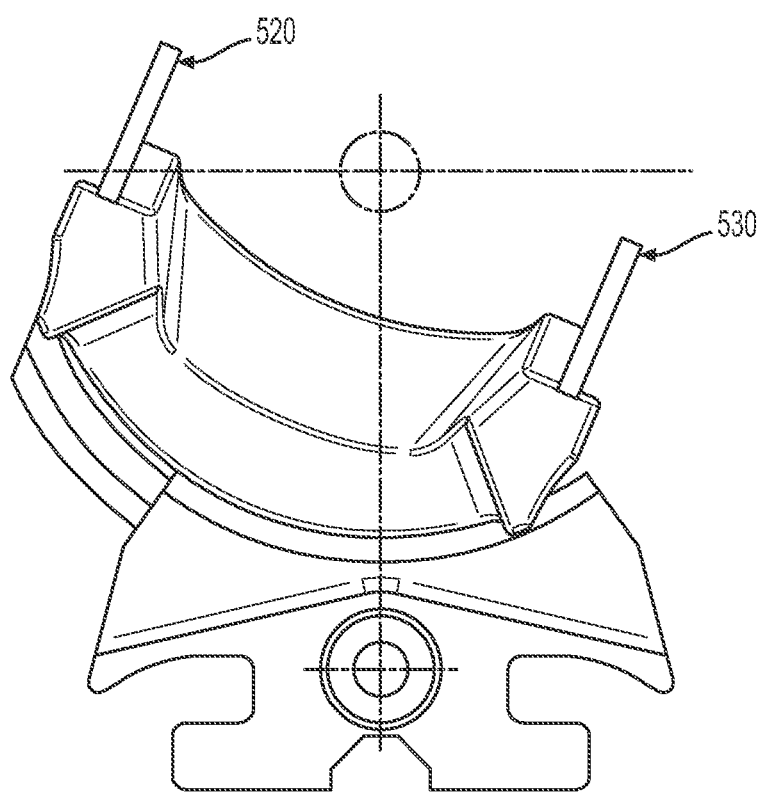
FIG. 10 depicts the conveyor belt scraper of FIG. 1 in a first inclined position.

The projection 450 defines the limit of pivoting. The range of pivoting of the pivot assembly 300 is restricted when the projection 450 comes into abutment with one of the stepped surfaces 230, 232 of the mounting base members 115, 116. In the configuration depicted in FIG. 10, the projection 450 is in abutment with one of the stepped surfaces 230, 232. As such, the position of FIG. 10 represents one end of the range of pivoting of the pivot assembly 300.

Figure 9:
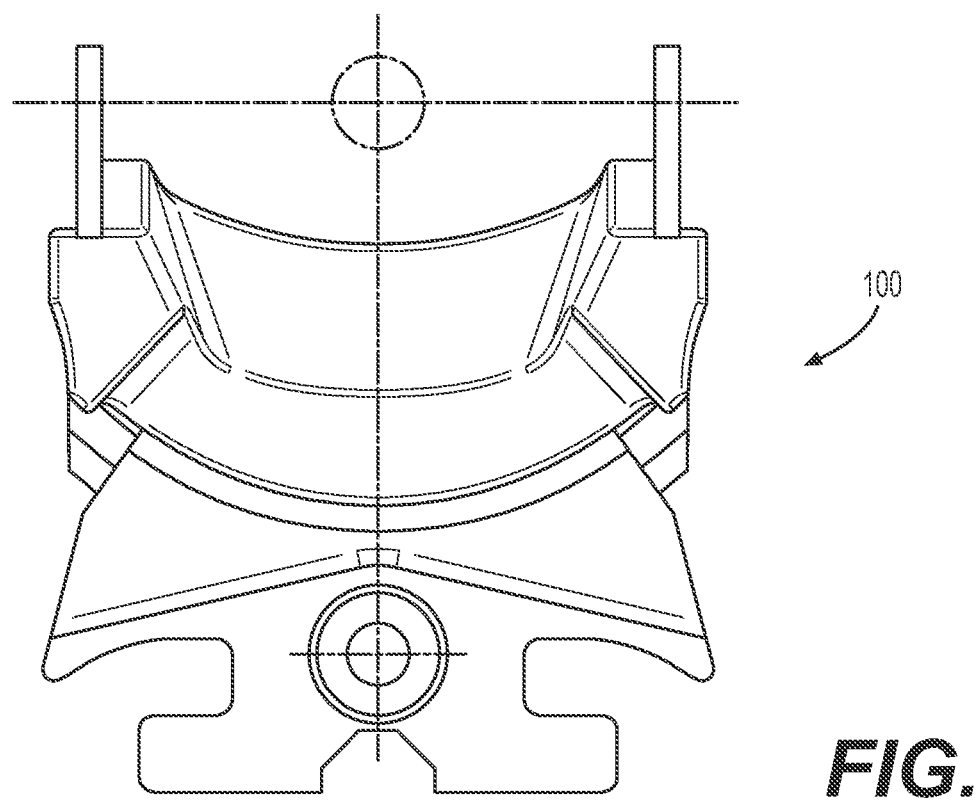
FIG. 9 depicts the conveyor belt scraper of FIG. 1 in a neutral position.
Figure 18:
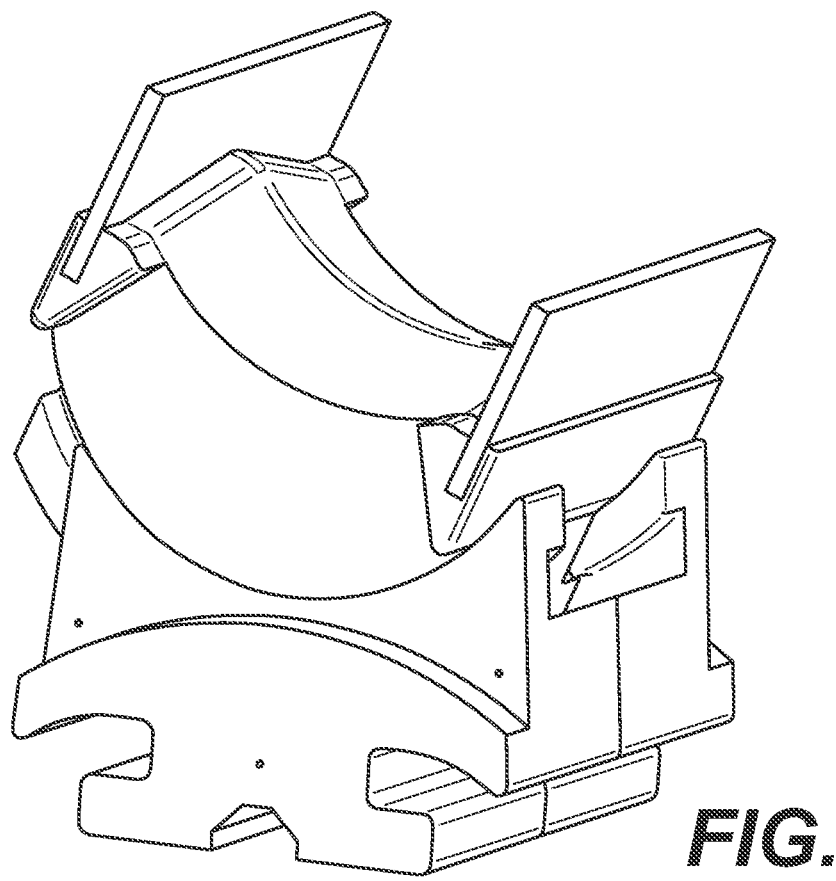
FIG. 18 is a further perspective view of the scraper blade of the second embodiment in an inclined position.
Figure 19:
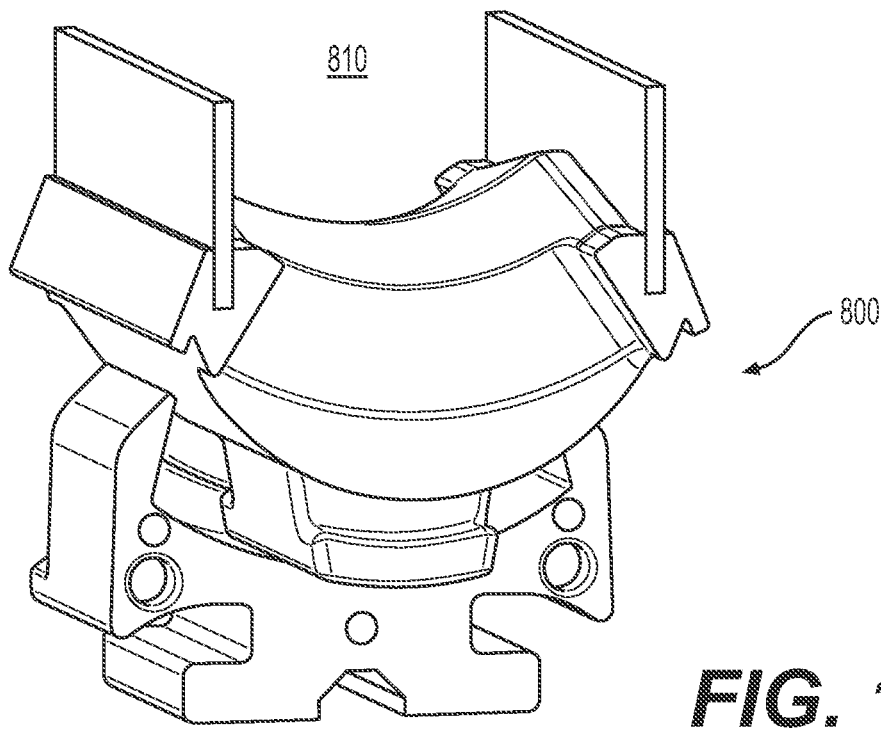
FIG. 19 is a partially assembled scraper blade according to a third embodiment.

As the pivot assembly 300 pivots about the centre point of the arcuate surface 410, the vertical position of the two blade tips 520, 530 changes. In a first position, the first blade tip 520 is vertically highest. For example, see FIG. 18. In a neutral, central position (as depicted n FIG. 9) the two blade tips 520, 530 are approximately at the same vertical position, and are positioned on the same horizontal plane. In a second position (not shown), the second blade tip 530 is vertically highest. The range of pivoting is at least 20 degrees and preferably up to about 30 degrees from neutral to each of the first and second positions (i.e. about 60 degrees in total from the first to the second position).

As shown in FIG. 5, an upper portion of the blade casket 400 includes a plurality of holes or apertures 425 which assist with embedment of the blade casket 400 in the pivot body 310. As such, the blade casket 400 is cast partially within the pivot body 310 which is fabricated from a polymer. During casting, polymer passes through the holes 425, creating increased bonding strength. The scraper tip 520, 530 of each blade 500, is located at a distal end, furthest from the mounting base 110. The scraper tips 520, 520 are parallel to each other, and are separated by a space.

In one embodiment, the pivot assembly 300 may be resiliently biased relative to the mounting base 110 with a spring, such that the blade tips 520, 530 sit at a desired vertical, neutral position in the absence of a pivot force generated by either contact with the conveyor belt, or contact with a blockage located on the surface of the conveyor belt.

The planar surfaces of each of the two blades 500 each extend through planes which are generally parallel.

The use of the conveyor belt scraper 100 will now be described. The conveyor belt scrapers 100 are assembled in row of like scrapers 100, such that the tips 520, 530 of each blade 500 extend longitudinally in a direction which is perpendicular to a direction of movement of the conveyor belt.

In normal operating conditions, the two blades 500 are typically in the neutral position. In this position, the planar surface of each blade is generally perpendicular to the surface of the conveyor belt, and the planar surface of each blade 500 extend generally vertically.

When the volume of material (such as coal) to be scraped is generally consistent, the two blade tips 520, 530 will be positioned at an approximately equal vertical position, such that both blades 500 are in continuous contact with the conveyor belt. When a significant blockage or restriction is encountered (such as a metal clip that joins two ends of the conveyor belt), the pivot assembly 300 is able to pivot relative to the axis YY, for example in a clockwise direction, such that the first scraper tip 520 moves beneath the restriction. After the restriction passes the first blade tip 520, the pivot assembly 300 is able to pivot about the axis YY, in the opposing, anti-clockwise direction, such that the tip 530 of the second blade 500 then moves beneath the restriction.

As described and depicted, in the preferred embodiment, each of the mounting base members 115, 116 includes a first female engagement formation in the form of an arcuate recess 220, and a first male engagement formation in the form of an arcuate projection 210. The pivot assembly 300 includes a corresponding second female engagement formation in the form of arcuate channel 460 and a corresponding second male engagement formation in the form of an arcuate flange 470.

It will be appreciated that the conveyor belt scraper 100 is not intended to be limited to this specific arrangement, but variations are envisaged which enable the pivot assembly 300 to pivot relative to the mounting base 110, whilst preventing the pivot assembly 300 from being removed from the mounting base 110.

The pivotal nature of the pivot housing 300 enables the two blade tips 520, 530 to continually pivot together to maintain the planar surfaces of the blades 500 at a perpendicular orientation relative to the conveyor belt surface.

Advantageously, the use of two blades 500 significantly extends the working life of the conveyor belt scraper 100 relative to single blade arrangements.

Advantageously, the two blades 500 generally remain perpendicular with the surface of the conveyor belt regardless of changes to the conveyor belt conditions, or changes in the mounting support structure holding the mounting base 110.

Due to the pivoting nature of the pivot assembly 300, the blade tips 520, 530 can automatically self-align relative to the conveyor belt as the mounting cartridge (the assembly on which the conveyor belt scrapers 100 are mounted), becomes worn. This negates the need to constantly re-adjust the angular orientation of the conveyor belt scrapers 100 or the support surface on which they are mounted.

A conveyor belt scraper 600 according to a second embodiment is depicted in FIGS. 11 to 14. The conveyor belt scraper 600 of the second embodiment has the same mounting base 110 and is functionally similar to the first embodiment, and as such, only the main areas of difference are described below. Primarily the blade arrangement is different. In particular, the blades 610 are each fabricated as generally planar steel blades 610 attached to a generally perpendicular base member 620. A blade assembly 625 is defined by the combination of the two blades 610 and the base member 620 which are secured with bolts 640 or other suitable fasteners. Alternatively, the blade assembly 625 may be welded or integrally formed in a casting or bending process.

In one embodiment, the blades 610 may be removable to facilitate replacing blades on account of wear or damage. In such an embodiment, the head of the bolts 640 or other fasteners can be externally accessed to permit the blades 610 to be released and replaced.

Figure 12:
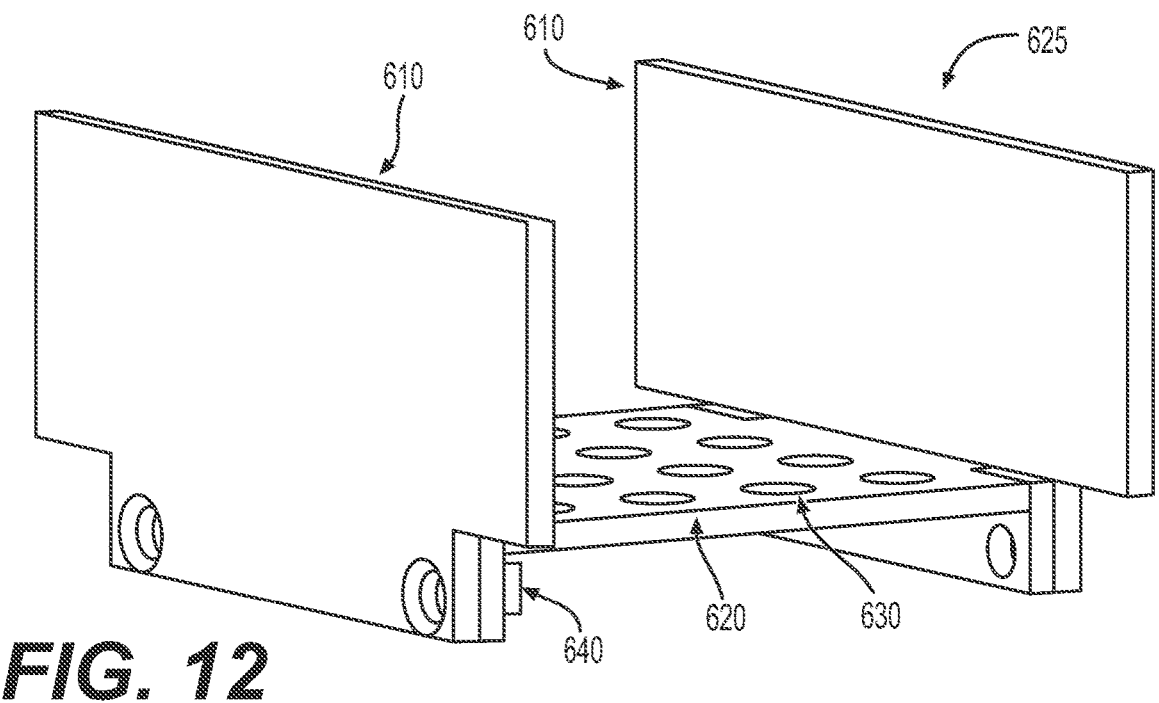
FIG. 12 is a top perspective view of the scraper blade of FIG. 11, depicted in isolation.
Figure 13:
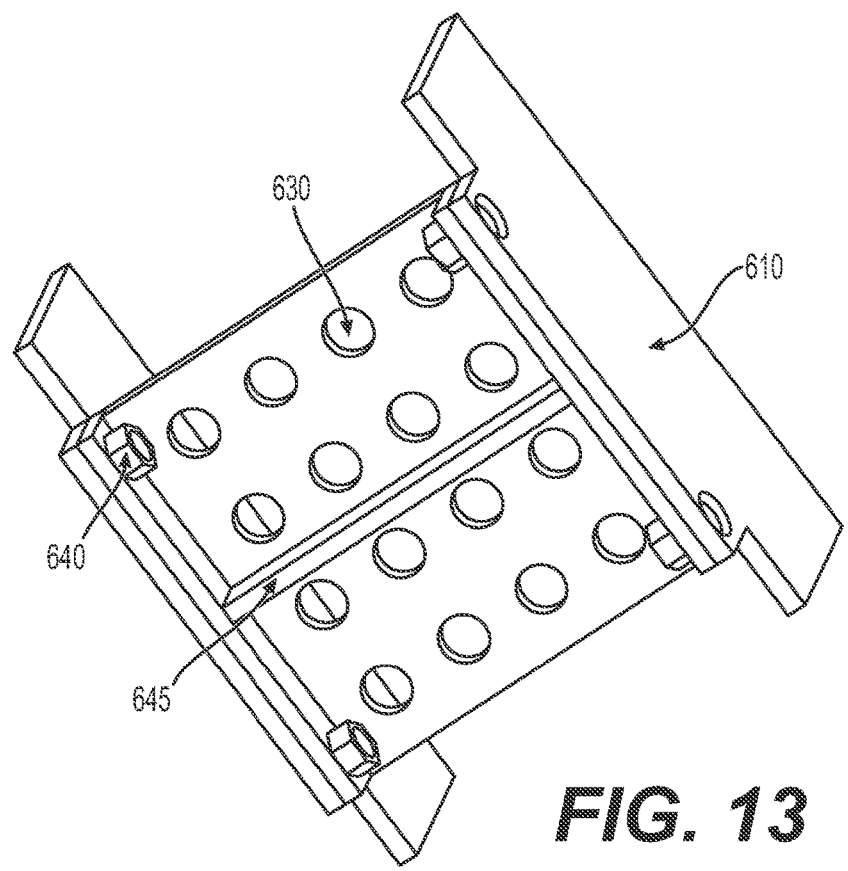
FIG. 13 is a bottom perspective view of the scraper blade of FIG. 11, depicted in isolation.
Figure 14:
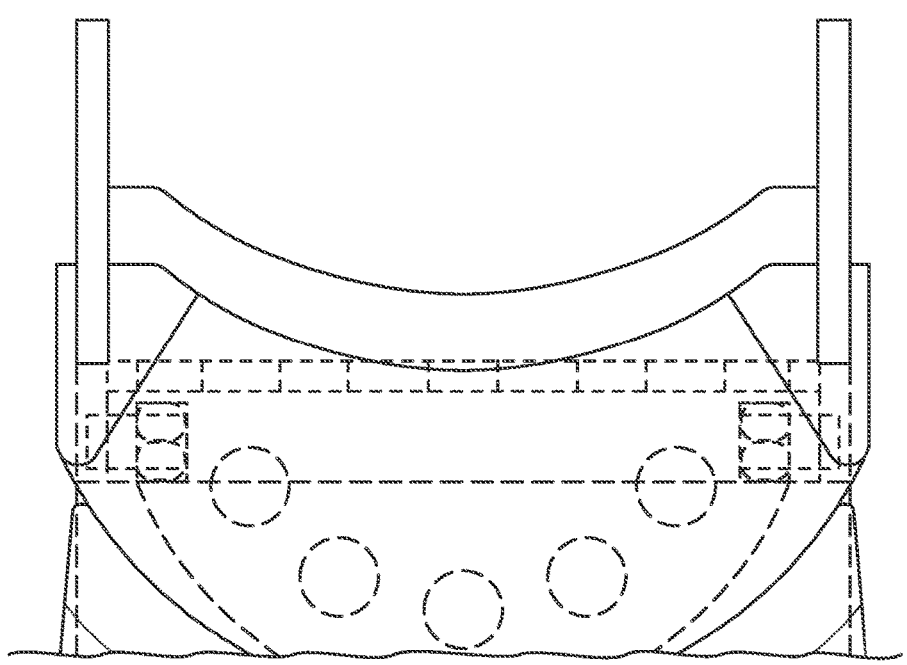
FIG. 14 is a side view showing the second embodiment of the conveyor belt scraper

As shown in FIGS. 12 and 13, the base member 620 of the blade assembly 625 has a plurality of holes 630 formed in it. The holes 630 assist with embedment of the blade assembly 625 into the polyurethane pivot body 700.

Referring to FIG. 13, a stiffening rib 645 is located on the underside of the base member 620.

Figure 11:
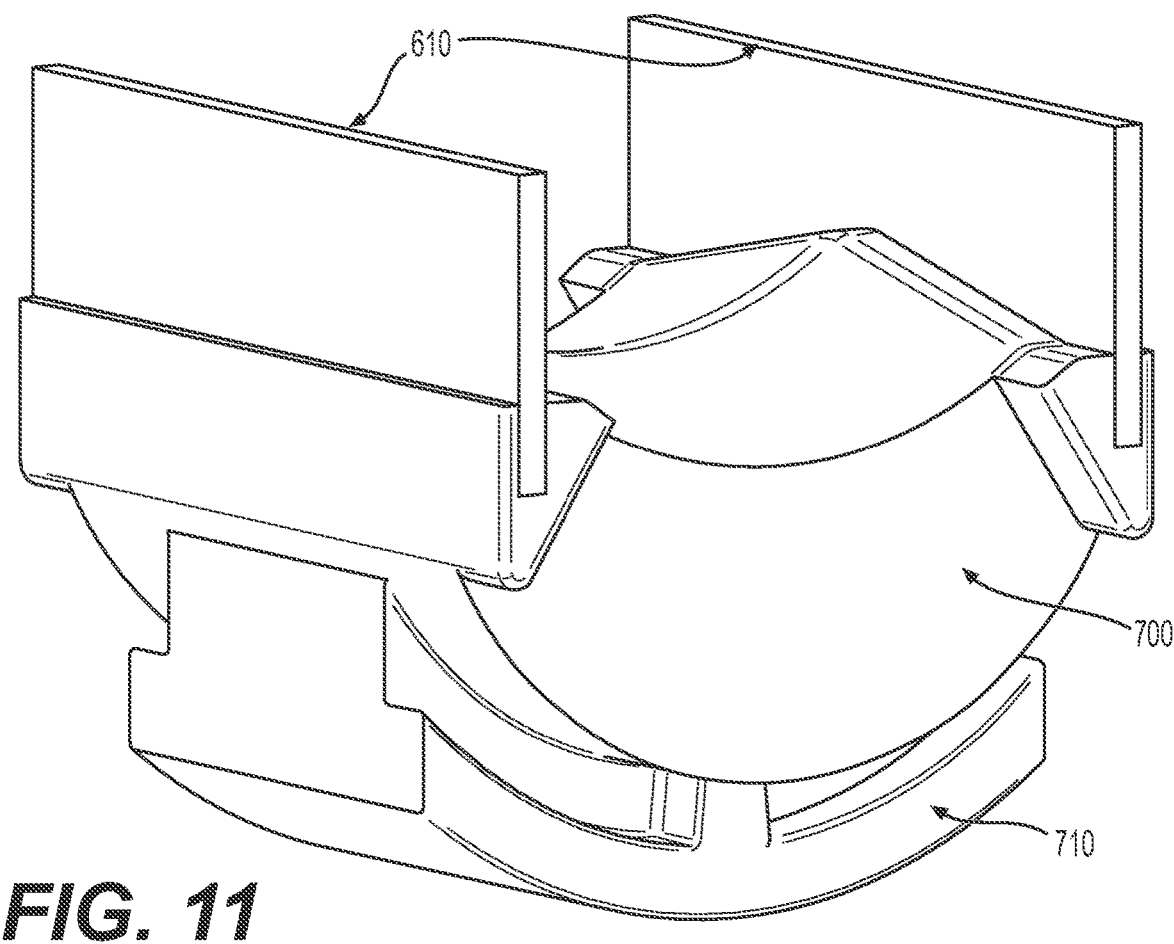
FIG. 11 is a perspective view showing a second embodiment of a conveyor belt scraper according to the present invention.

Referring to FIG. 11, the pivot body 700 is similar to the first embodiment, with the exception that the metal blade casket does not project from the base of the pivot body 700. In contrast, the arcuate I-shaped protrusion (which has an outermost radius corresponding generally with a radius of a portion of the guide member 200 defining the arcuate recess 220) is defined directly by a portion of the pivot body 700 which is preferably integrally formed with the remainder of the pivot body 700 from the same polymeric material. In this way, the manufacturing process according to the second embodiment negates the need for the casket 400 to be cast from stainless steel or anther such metal, thereby reducing the production costs.

With the exception of the lower portion of the pivot body 700 being manufactured from polymer (rather than metal), the conveyor belt scraper 600 of the second embodiment has the same or at let a similar external appearance to the conveyor belt scraper 100 of the first embodiment.

A third embodiment of a conveyor belt scraper 800 is depicted in FIGS. 19 to 25. The scraper 800 of the third embodiment is a variation of the second embodiment, and the points of difference will be discussed below. In general, the scraper 800 is intended to be consumable, and completely replaced after some period of service, such as 6 weeks of continuous use. As such, the blades 810 are not intended to be interchanged or replaceable. Furthermore, the guide member 820 and pivot assembly 830 are generally all fabricated from a durable polymer, to reduce manufacturing costs, such that the only steel components are the blade 810 and the blade casket 840, which is depicted in isolation in FIG. 24.

Figure 20:
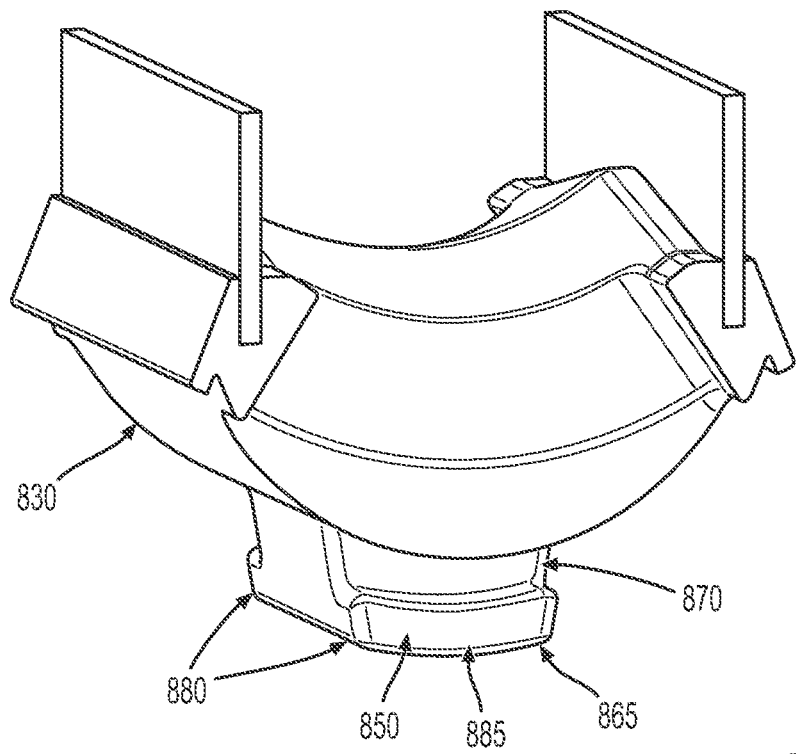
FIG. 20 is a perspective view of a pivot assembly of the conveyor belt scraper of FIG. 19.

Referring to FIG. 20, the underside of the pivot assembly 830 includes a projection 850, in the form of an arcuate inverted T-shaped protrusion 865, defined by a stem 870 and a pair of laterally extending arms 880. The outermost radius of each arm 880, and the curved surface 885 which is located furthest from the pivot assembly 830 corresponds generally with a radius of a contact portion 895 of the guide member 820 defining the arcuate recess 898.

Figure 21:
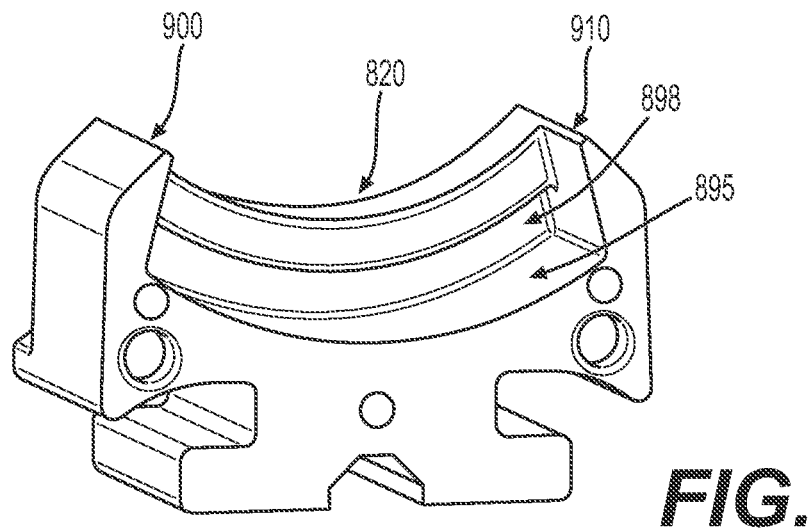
FIG. 21 is perspective view of a first mounting base member of the conveyor belt scraper of FIG. 19.
Figure 22:
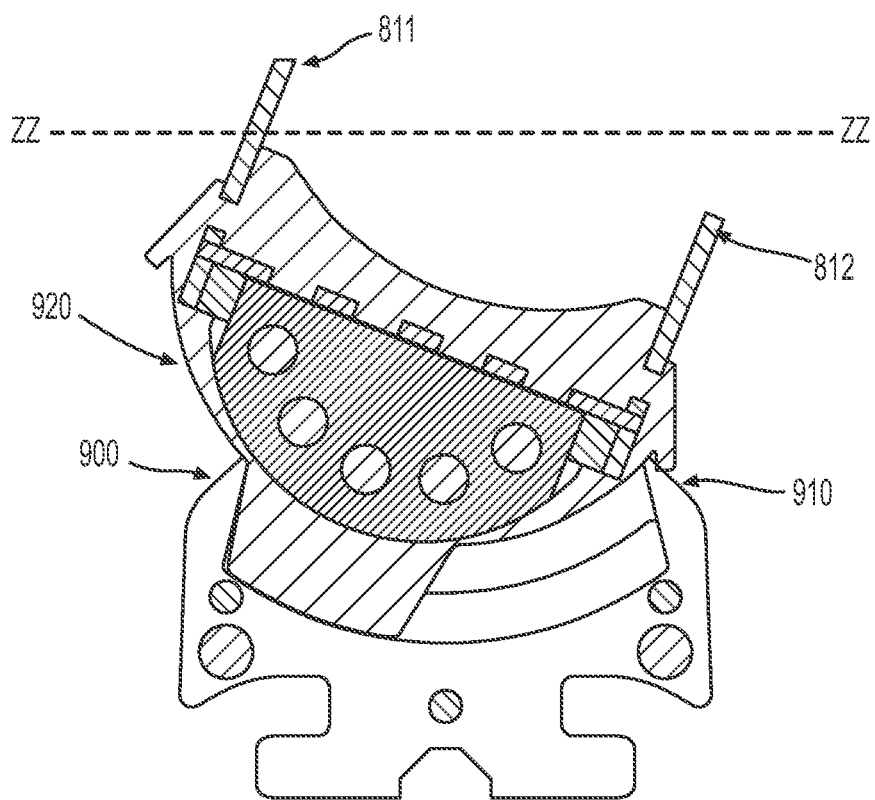
FIG. 22 is cross-sectional schematic showing the scraper blade of FIG. 19 in a first pivot position.
Figure 23:
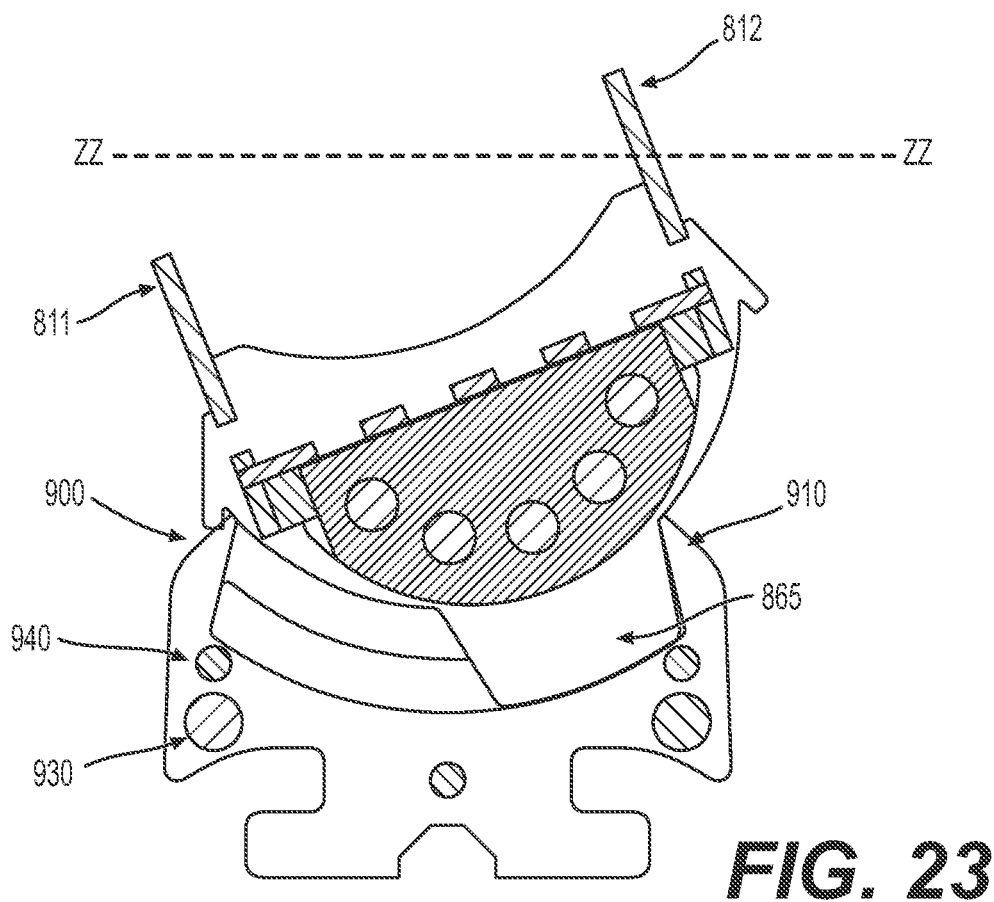
FIG. 23 is cross-sectional schematic showing the scraper blade of FIG. 19 in a second pivot position.

Referring to FIG. 21, two stopper formations 900, 910 define the limits of pivotal movement of the inverted T-shaped protrusion 865. Hence, when the inverted T-shaped protrusion is generally central, the pivot assembly 830 is in a neutral position, in which each scraper tip is located on a common plane ZZ, which in operation is normally horizontal. Furthermore, when the first stopper formation 900 abuts against the inverted T-shaped protrusion 865, the pivot assembly is in a first position, depicted in FIG. 22, in which the first scraper tip 811 is located above the common plane ZZ and the second scraper tip 812 is located below the common plane ZZ. Likewise, as depicted in FIG. 23, when the second stopper formation 910 abuts against the inverted T-shaped protrusion 865, the pivot assembly 830 is in a second position in which the first scraper tip 811 is located below the common plane ZZ and the second scraper tip 812 is located above the common plane ZZ.

The first and second stopper formations 900, 910 also provide a scraping and/or sealing function on account of the distal end of each stopper formation 900, 910 abutting against or at least being locate in close proximity to the arcuate underside surface 920 of the pivot assembly 830. In this manner, the stopper formations 900, 910 inhibit debris such as scaped coal from entering into the pivot mechanism, where it may inhibit the conveyor belt scraper 800 from pivoting as intended.

In the third embodiment, the two sides of the mounting base are held together with male and female locating tabs 930 and fasteners which are inserted through holes 940 to provide a clamping force.

Figure 24:
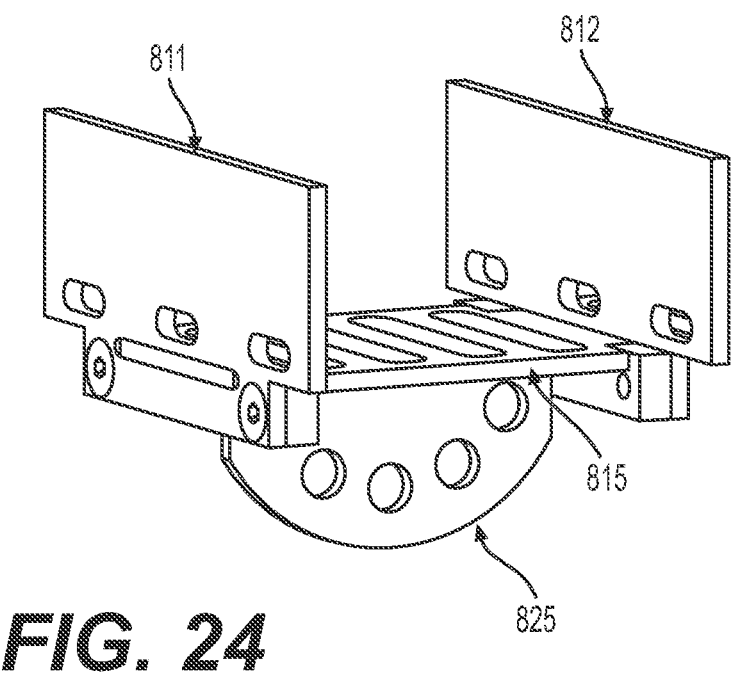
FIG. 24 depicts a blade casket of the scraper blade of FIG. 19.

Referring to FIG. 24, the blades 810 are mounted to a casket 815, which includes a curved stiffening rib 825 which provides increased blade 810 rigidity, and increased polymer bonding due to the apertures which are present.

Figure 25:
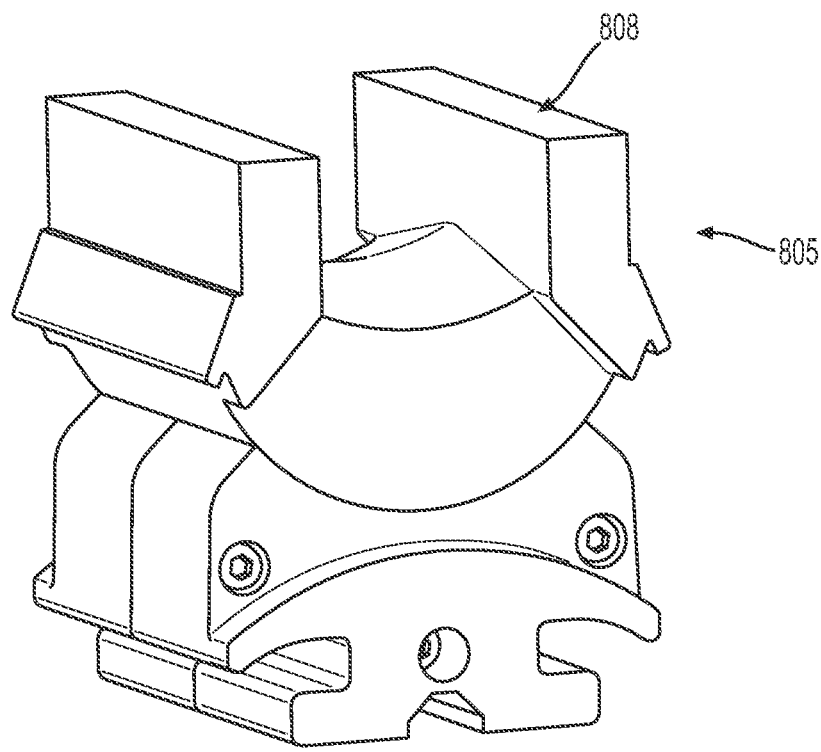
FIG. 25 depicts an end scraper for use with the scraper blade of FIG. 19.

FIG. 25 shows a variation of the scraper 805 for use at each end of a row of scrapers 800. The scraper 805 is functionally similar but rather than using steel blades, it has thick polymer blocks 808 which support the edges of the conveyor belt.

A fourth embodiment of a conveyor belt scraper 1000 is depicted in FIGS. 26 to 29, being a variation of the third embodiment 800, and further including a liquid spray function.

Figure 26:
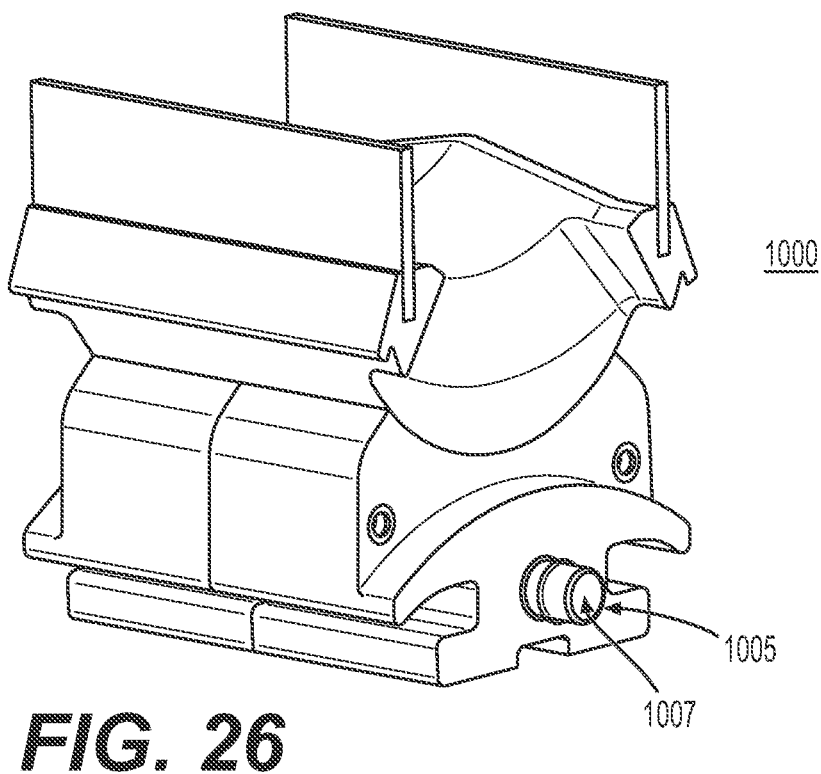
FIG. 26 is a perspective view of a scraper blade assembly according to a fourth embodiment.
Figure 27:
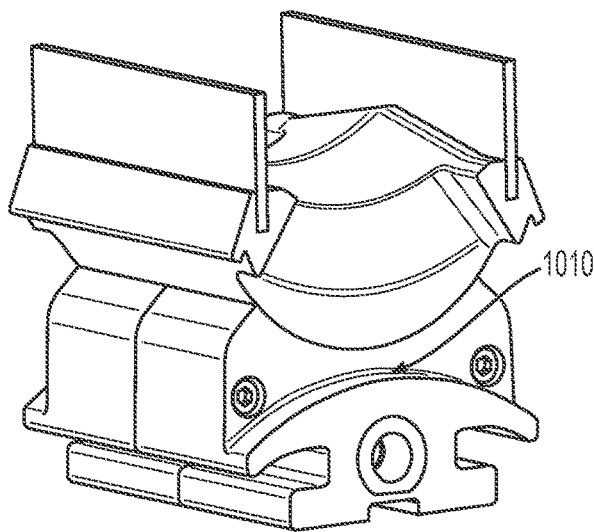
FIG. 27 is a further variation of the scraper blade assembly of FIG. 26.

Referring to FIG. 26, a liquid ingression passage 1005 extends through each mounting base. This may be achieved in numerous ways, for example using a single pipe or tube which extends through all scrapers in an assembly, alternatively each scraper base may have a female formation on one side and a corresponding male port or spigot on the opposing side, such that the scrapers 1000 can be connected end to end to define a continuous liquid flow path. Spry nozzles 1010 are located on one or both sides of each scraper 1000. The nozzles 1010 can be used to spray water or another liquid upward to clean the scrapers 1000. Water or another liquid may also be directed internally toward the pivot contact surfaces around the arcuate inverted T-shaped protrusion 865 to reduce friction. Water spraying may be conducted continuously, intermittently or as required.

Figure 28:
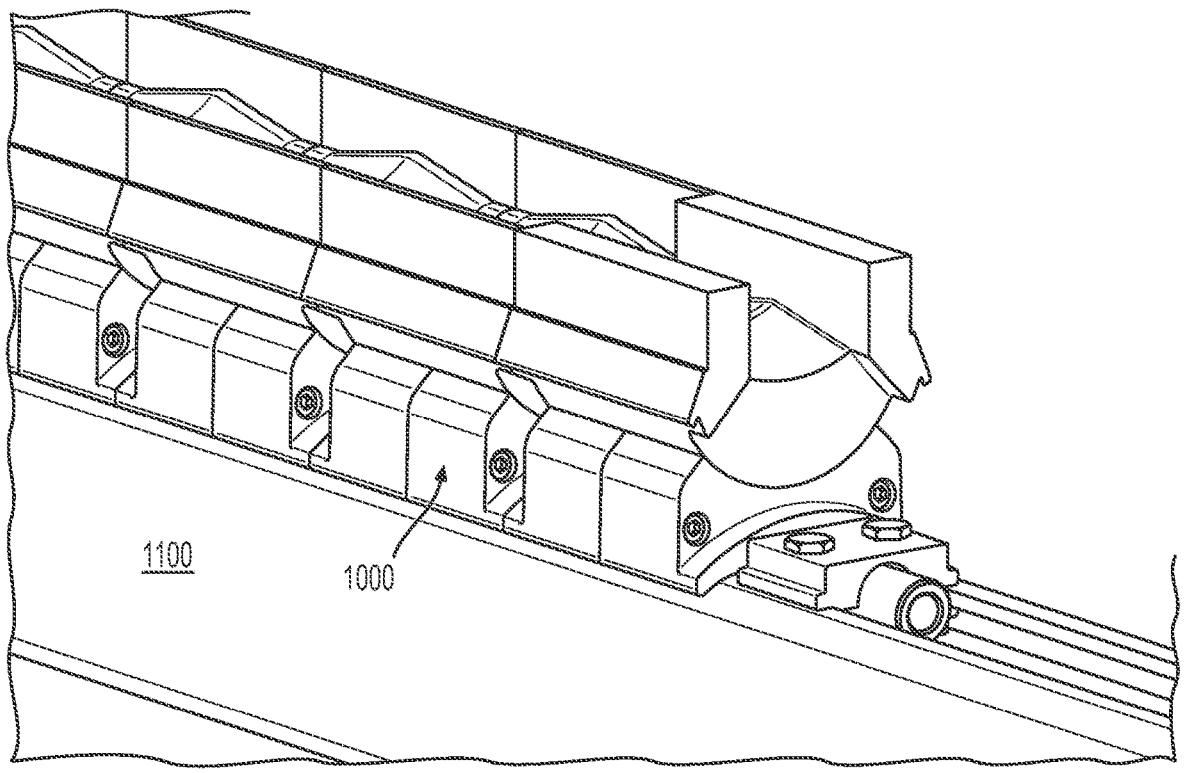
FIG. 28 is a perspective view of the scraper blade of FIGS. 26 and 27 assembled in a linear assembly.
Figure 29:
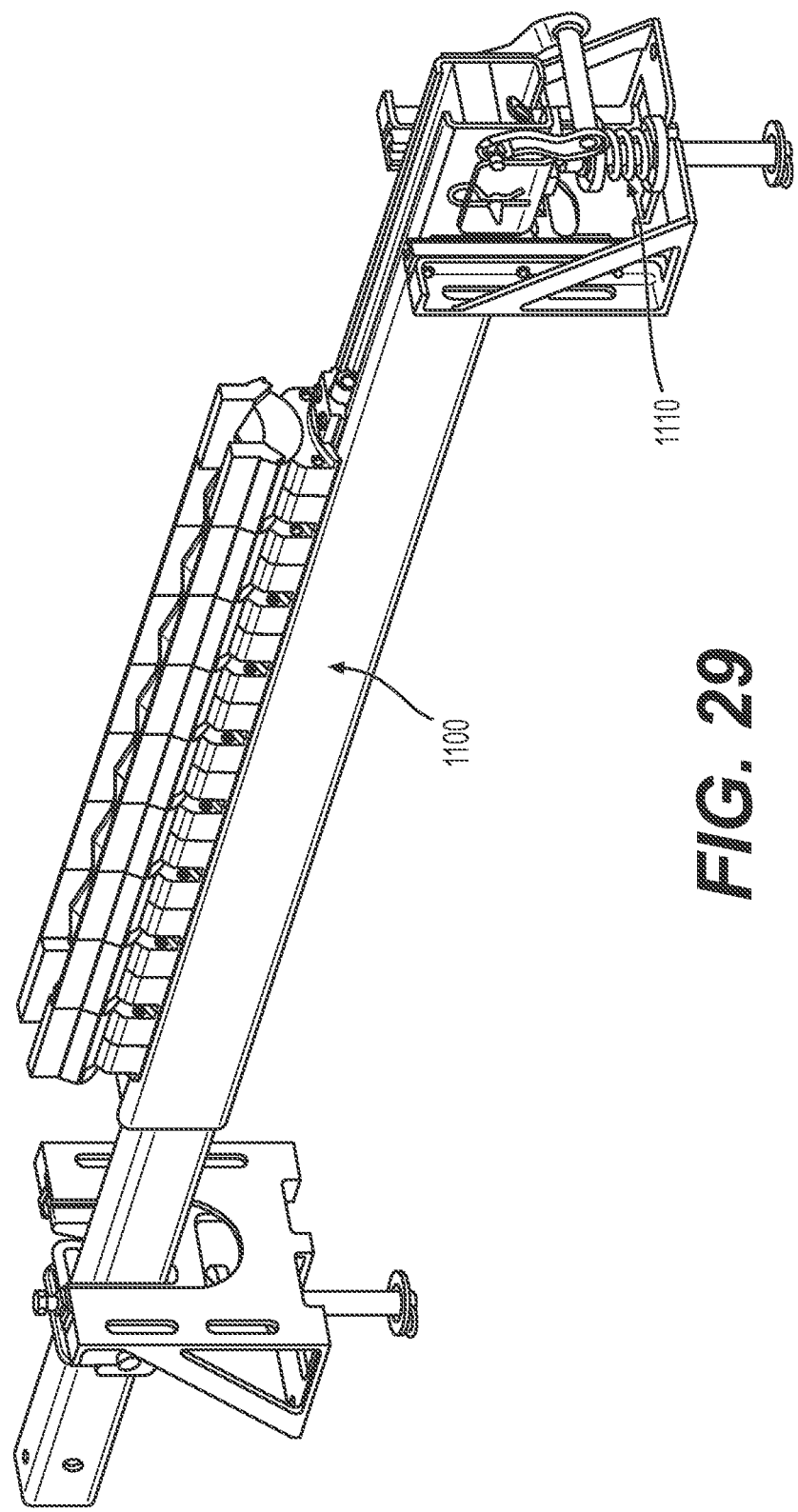
FIG. 29 depicts the scraper blades of FIGS. 26 and 27 mounted on a spring biased support structure.
Figure 30:
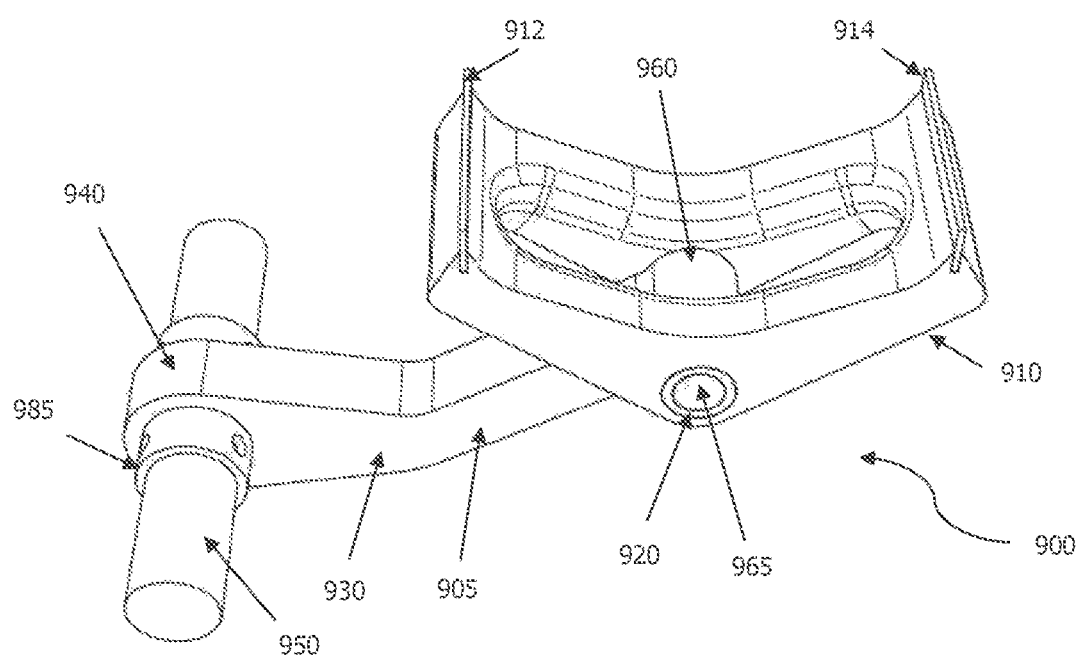
FIG. 30 is a top perspective view of a scraper blade assembly according to a fifth embodiment.

FIGS. 28 and 29 shows the scrapers 800, 805 mounted on a support bar 1100. Each end of the support bar 1100 is spring biased upwardly with a spring 1110 which urges the support bar 1100 upward, but can permit deflection downwardly if one or more of the scrapers 800 encounter a large force. Alternatively, an air cushion assembly may be used to achieve similar deflection characteristics.

FIGS. 30 to 34 disclose a conveyor belt scraper 900 according to a fifth embodiment. The conveyor belt scraper 900 is functionally similar to the aforementioned embodiments. However, the pivot assembly 910 pivots about a pivot axis 920 which is located at a junction between the pivot assembly 910 and the mounting base 905.

In particular, the mounting base 905 includes an arm 930 which has a proximal end 940 mounted to a support shaft 950 and a distal end 960 pivotally mounted to the pivot assembly 910.

Figure 31:
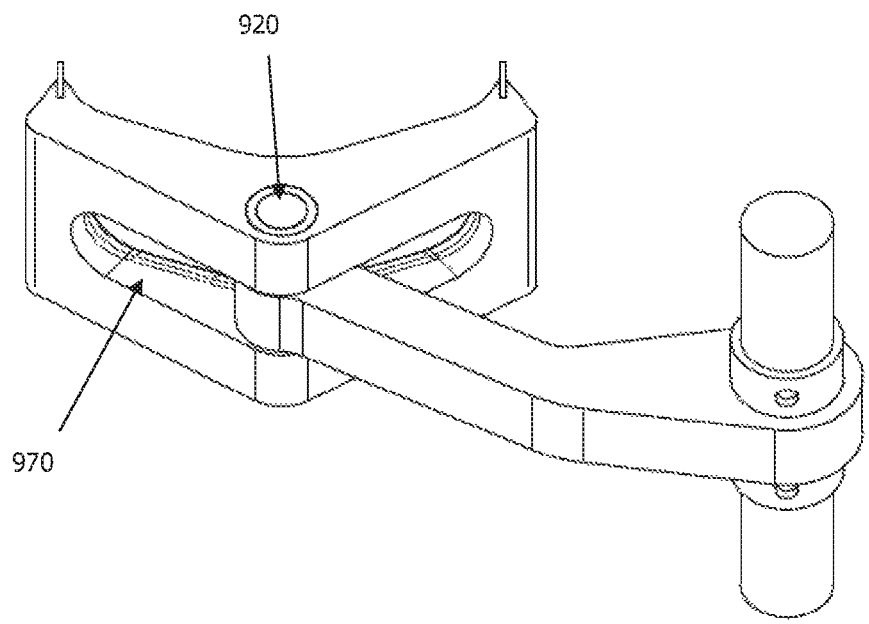
FIG. 31 is a bottom perspective view of the scraper blade assembly of FIG. 30.

The distal end 960 of the arm 930 is secured to the pivot assembly with a pin connection 965. Referring to FIG. 31, the pin connection 965 permits pivoting about the axis 920 by around 180 degrees. However, in practice, much smaller angular ranges of pivoting are envisaged.

Figure 32:
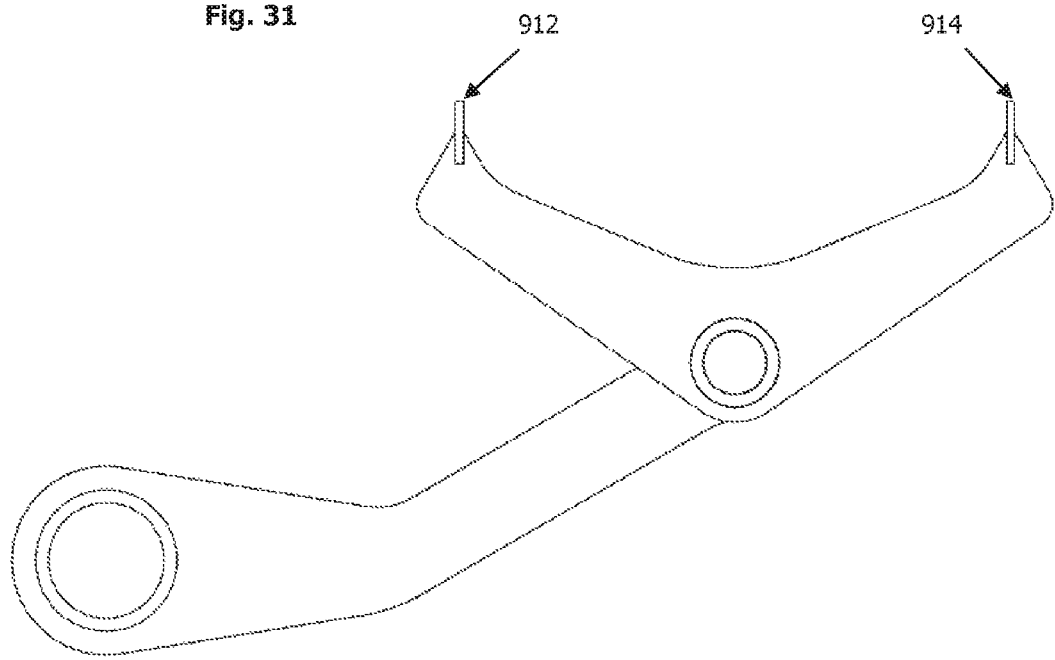
FIG. 32 is a side view of the scraper blade assembly of FIG. 30.

As shown in FIG. 32, the pivot assembly 910 has a generally "V" shaped profile in side view. A slot or channel 970 extends through the pivot assembly 910, perpendicular to the pivot axis 920.

Figure 33:
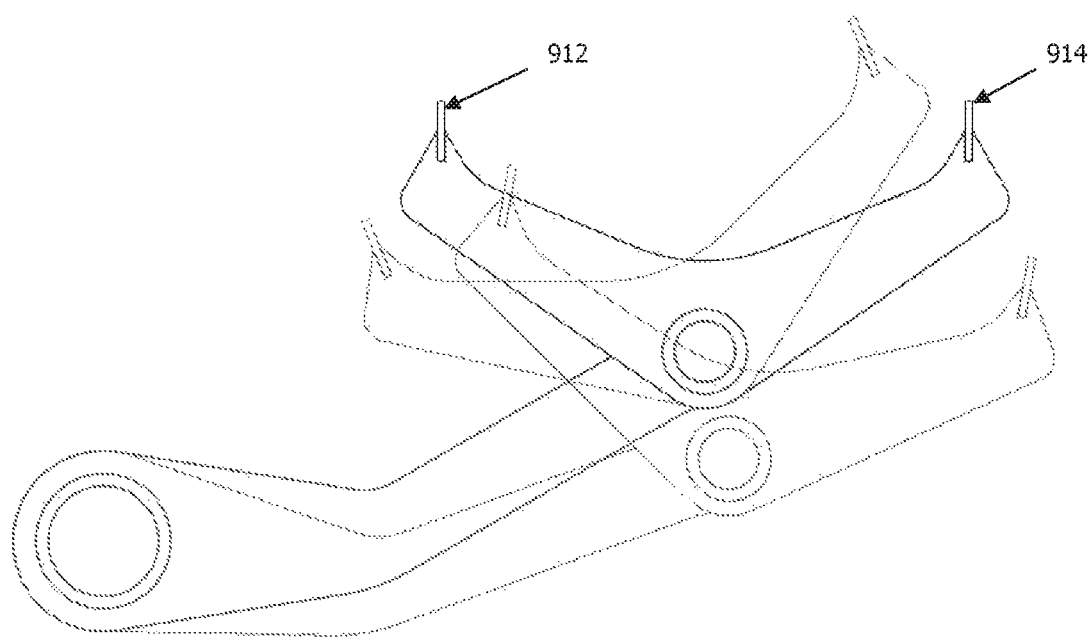
FIG. 33 is a side schematic view of the scraper blade assembly of FIG. 30 depicting different positions during use.
Figure 34:
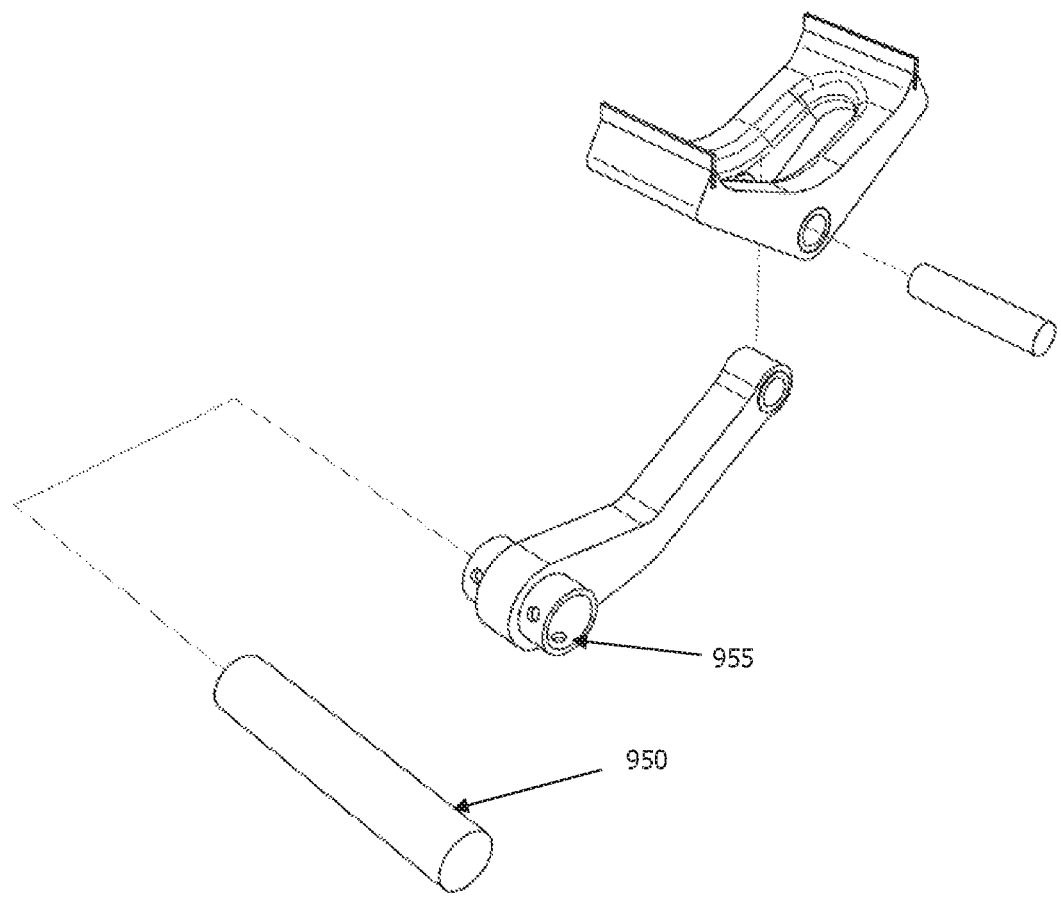
FIG. 34 is an exploded view showing the parts of the scraper blade assembly of FIG. 30 disassembled.

A first blade 912 is located at an upper portion of a first arm of the generally "V" shaped pivot assembly 910, and a second blade 914 is located at an upper portion of a second arm of the generally "V" shaped pivot assembly 910. Referring to FIG. 33, the blades 912, 914 are depicted in different positions, such as both blades 912, 914 being located on the same horizontal plane, or alternatively the first blade 912 being located above the horizontal plane, or alternatively the first blade 912 being located below the horizontal plane.

Referring to FIG. 33, the arm 930 is also pivotal about the support shaft 950. As such, the position of the blades 905, 915 may be influenced by either movement of the arm 930 relative to the support shaft 950, or alternatively the movement of the pivot assembly 910 relative to the arm 930.

A tubular collar 985 is located on either side of the arm 930. In practice, the pivot assembly 910 of adjacent conveyor belt scrapers 900 abut against each other when the conveyor belt scrapers 900 are located side by side on the same support shaft 950 or mounting structure, to define a continuous scraper.

The tubular collar 985 includes holes 955 to enable fasteners to secure the collar 985, and hence the conveyor belt scraper 900, relative to the support shaft 950. The ends of the shaft 950 may be resiliently mounted so that the shaft 950 can rotationally deflect if an excessively large force is applied to one of the blades by the conveyor belt. The resilient mounting can be achieved with a spring mounting assembly for the shaft 950 or alternatively an air mounting type arrangement.

Furthermore, the arm 930 may be fabricated from an elastically deformable material such as a polymer which permits the arm 930 to elastically deform or flex during use.

The conveyor belt scraper 900 may be mounted in different ways. For example, it may be slid into a cartridge so it can be readily removed for service. Alternatively, the conveyor belt scrapers 900 can be mounted end to end on a shaft 950 which is supported at each opposing end.

Advantageously, the conveyor belt scrapers 100, 600, 800 are omnidirectional, meaning there is no need for them to be installed facing a given direction. Furthermore they are compatible with forward and reversing conveyor belts.

Advantageously, the conveyor belt scrapers 100, 600, 800 have an increased scraping capacity, up to twice the capacity of existing conveyor belt scrapers.

Advantageously, the conveyor belt scrapers 100, 600, 800 are suitable for use in locations with low vertical clearances and limited access.

Advantageously, the conveyor belt scraper 100, 600, 800 functions well with clipped or joined conveyor belts, permitting changing angles of the pivot assembly 300 as the metal conveyor joining clips pass the conveyor belt scraper 100, 600, 800.

Advantageously, the conveyor belt scraper 100, 600, 800 overcomes issues including incorrect alignment to the conveyor belt, as the alignment is self-regulating and self-adjusting under pressure.

Advantageously, the conveyor belt scraper 100, 600, 800 Self-adjusts/aligns to changing belt angles and tensions. Furthermore the conveyor belt scraper 100, 600, 800 Self-adjusts/aligns to worn components such as slide cartridges.

Although the invention has been described with reference to specific examples, it will be appreciated by those skilled in the art that the invention may be embodied in many other forms.

The invention claimed is:

1. A conveyor belt scraper comprising:
a mounting base adapted to be mounted on a support structure;
a pivot assembly pivotally connected to the mounting base;
first and second scraper blades secured to the pivot assembly, wherein a scraping tip of the first scraper blade and a scraping tip of the second scraper blade are separated by a space and the scraping tips each extend generally parallel to a pivot axis of the pivot assembly, wherein the pivot assembly is pivotal between:
a neutral position in which each scraper tip is located on a common plane;
a first position in which the first scraper tip is located above the common plane and the second scraper tip is located below the common plane; and
a second position in which the first scraper tip is located below the common plane and the second scraper tip is located above the common plane;
wherein the mounting base includes an arm having a proximal end mounted to a support rod and a distal end pivotally mounted to the pivot assembly.

2. The conveyor belt scraper of claim 1, wherein the mounting base includes a first female engagement formation in the form of an arcuate recess, and a first male engagement formation in the form of an arcuate projection;
further wherein the pivot assembly includes a corresponding second female engagement formation in the form of arcuate channel and a corresponding second male engagement formation in the form of an arcuate flange.

3. The conveyor belt scraper of claim 2, wherein a surface of the pivot assembly closest to the mounting base is arcuate, and adapted to be received by a corresponding arcuate surface of the mounting base.

4. The conveyor belt scraper of claim 2, wherein the second female engagement formation and the second male engagement formation of the pivot assembly define a protrusion having an inverted T-shaped profile in cross-section, located generally equidistant between the first and second scraper blades.

5. The conveyor belt scraper of claim 4, wherein the mounting base includes first and second stopper formations configured to abut against opposing ends of the protrusion having an inverted T-shaped profile to define the first and second scraper blade positions.

6. The conveyor belt scraper of claim 5, wherein the stopper formations terminate in abutment with or adjacent to an arcuate underside surface of the pivot assembly.

7. The conveyor belt scraper of claim 1, wherein the mounting base is defined by a first mounting base member and a second like mounting base member which are secured to each other with one or more fasteners.

8. The conveyor belt scraper of claim 7, wherein a proximal portion of the pivot assembly is seated between distal portions of the first mounting base member and the second mounting base member.

9. The conveyor belt scraper of claim 1, wherein the pivot axis of the pivot assembly is located on a plane which passes through an axis of symmetry of the mounting base when viewed in end view.

10. The conveyor belt scraper of claim 1, wherein the first and second scraper tips are adapted to extend longitudinally in a direction which is generally perpendicular to a drive direction of an adjacent conveyor belt.

11. The conveyor belt scraper of claim 1, wherein each of the first and second scraper blades is generally planar and is partially embedded within the pivot assembly, such that the scraping tip protrudes from the pivot assembly.

12. The conveyor belt scraper of claim 1, wherein a portion of the pivot assembly located between the first and second scraper blades has a central ridge defined by two inclined surfaces, in the form of a generally inverted "V" shaped portion.

13. The conveyor belt scraper of claim 12 further comprising at least one material removal cut-out located in a lateral portion of the pivot assembly.

14. The conveyor belt scraper of claim 13, wherein the mounting base includes a curved surface located beneath the material removal cut-out to direct material away from the mounting base.

15. The conveyor belt scraper of claim 13, wherein the material removal cut-out is positioned on each of two opposing lateral sides of the conveyor belt scraper, such that when a first conveyor belt scraper is positioned adjacent to a second, like conveyor belt scraper, a cut-out of the first conveyor belt scraper and a cut-out of the second conveyor belts scraper combine to define a material removal passage.

16. The conveyor belt scraper of claim 1, wherein the mounting base includes a fluid flow passage extending generally parallel with the first and second scraper blades, the fluid flow passage being couplable with an adjacent like conveyor belt scraper.

17. The conveyor belt scraper of claim 1, wherein the distal end of the arm is secured to the pivot assembly with a pin connection.

18. The conveyor belt scraper of claim 17, wherein the pivot assembly is configured to pivot up to about 180 degrees relative to the distal end of the arm.

19. The conveyor belt scraper of claim 17, wherein a channel extends through a portion of the pivot assembly, the channel extending in a direction generally perpendicular to an axis of rotation of the pin connection, and the distal end of the arm is located within the channel.

20. A conveyor belt scraper comprising:
a mounting base adapted to be mounted on a support structure;
a pivot assembly pivotally connected to the mounting base;
first and second scraper blades secured to the pivot assembly, wherein a scraping tip of the first scraper blade and a scraping tip of the second scraper blade are separated by a space and the scraping tips each extend generally parallel to a pivot axis of the pivot assembly,
wherein the pivot assembly is pivotal between:
a neutral position in which each scraper tip is located on a common plane;
a first position in which the first scraper tip is located above the common plane and the second scraper tip is located below the common plane; and
a second position in which the first scraper tip is located below the common plane and the second scraper tip is located above the common plane;
wherein the mounting base includes a first female engagement formation in the form of an arcuate recess, and a first male engagement formation in the form of an arcuate projection; and
wherein the pivot assembly includes a corresponding second female engagement formation in the form of arcuate channel and a corresponding second male engagement formation in the form of an arcuate flange.

* * * * *